United States Patent
Kruglick

(10) Patent No.: US 9,143,491 B2
(45) Date of Patent: Sep. 22, 2015

(54) QUORUM-BASED VIRTUAL MACHINE SECURITY

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 254 days.

(21) Appl. No.: 13/877,377

(22) PCT Filed: Oct. 29, 2012

(86) PCT No.: PCT/US2012/062411
§ 371 (c)(1),
(2) Date: Apr. 2, 2013

(87) PCT Pub. No.: WO2014/070134
PCT Pub. Date: May 8, 2014

(65) Prior Publication Data
US 2014/0201533 A1    Jul. 17, 2014

(51) Int. Cl.
*G06F 21/62* (2013.01)
*H04L 29/06* (2006.01)

(52) U.S. Cl.
CPC .............. *H04L 63/062* (2013.01); *G06F 21/62* (2013.01)

(58) Field of Classification Search
CPC . H04L 63/061; H04L 63/062; H04L 63/0442; H04L 9/0844; H04L 9/085; G06F 21/602; G06F 21/604; G06F 21/606
USPC ............. 713/171, 180, 189; 380/44, 277–280
See application file for complete search history.

(56) References Cited

U.S. PATENT DOCUMENTS 6,178,508 B1    1/2001    Kaufman
6,587,946 B1    7/2003    Jakobsson
(Continued)

FOREIGN PATENT DOCUMENTS

WO    PCT/US12/62411    10/2012

OTHER PUBLICATIONS

"Encryption Key Management | Enterprise Key Management Server (EKMS)," Retrieved from URL: https://web.archive.org/web/20120907044038/http://www.zecurion.com/zserver/ekms.php, on Jan. 28, 2015, pp. 1-2.
(Continued)

*Primary Examiner* — Kambiz Zand
*Assistant Examiner* — Noura Zoubair
(74) *Attorney, Agent, or Firm* — Jensen & Puntigam, PS

(57) ABSTRACT

Technologies related to quorum-based Virtual Machine (VM) security are generally described. In some examples, VM data, such as a VM payload or other VM data, may be quorum-encrypted, such that a quorum of decryption keys may be used to decrypt the data. Decryption keys may be distributed among multiple VMs, with different decryption keys provided to different VMs, so that single VMs may not decrypt the VM data without decryption keys held by other VMs. To decrypt its data, a VM may assemble a quorum of decryption keys by requesting decryption keys held by other operational VMs, and the VM may then decrypt its data using the assembled quorum of decryption keys. The VM may be prevented from decrypting its data without a sufficient quorum of other operational VMs.

21 Claims, 7 Drawing Sheets

(56) References Cited

U.S. PATENT DOCUMENTS

| | | | |
|---|---|---|---|
| 8,842,835 B2* | 9/2014 | Geyzel et al. ............. | 380/277 |
| 2011/0116636 A1 | 5/2011 | Steed | |
| 2011/0270763 A1* | 11/2011 | Graham et al. ............. | 705/71 |
| 2012/0096269 A1 | 4/2012 | McAlister | |

OTHER PUBLICATIONS

International Searching Authority, International Search Report and Written Opinion of the International Searching Authority for PCT/US12/62411, Mar. 5, 2013.

Kirda, A Security Analysis of Amazon's Elastic Compute Cloud Service, Dependable Systems and Networks Workshops (DSN-W) presentation, Jun. 25, 2012, 30 pages.

Balduzzi, A Security Analysis of Amazon's Elastic Compute Cloud Service, Paper, Proceedings of the 27th Annual ACM Symposium on Applied Computing, Mar. 25, 2012, 8 pages.

Zecurion, Zserver Storage Key Features, web page accessed at http://www.zecurion.com/zserver/encrypt-data-files-server-features.php on Mar. 1, 2012, 3 pages.

Certes Networks, Making the Cloud Safe for Sensitive Workloads, Solution Note, retrieved from http://web.archive.org/web/20120704113255/http://www.certesnetworks.com/pdf/sn-cloud-security.pdf, Jul. 2012, 2 pages.

High Cloud Security, Are your virtual machines safe?, web page accessed at www.highcloudsecurity.com/solutions/are-your-virtual-machines-safe/ on Mar. 21, 2013, 2 pages.

Ravikiran Peelukhana et al., Securing Virtual Images Using Blind Authentication Protocol, IJEST, vol. 3, No. 4 Apr. 2011, 8 pages.

Piston, Security that starts at the bare metal, web page accessed at www.pistoncloud.com/openstack-cloud-software/cloud-security/ on Mar. 21, 2013, 3 pages.

Porticor Cloud Security, Porticor joins Amazon Web Services Partner Network to protect private information on AWS environments, News Release, Jul. 29, 2012, 2 pages.

Somorovsky, All Your Clouds are Belong to us—Security Analysis of Cloud Management Interfaces, CCSW'11, Oct. 21, 2011, 12 pages.

* cited by examiner ness, embodiments, and features will become apparent by reference to the drawings and the following detailed description.

QUORUM-BASED VIRTUAL MACHINE SECURITY

CROSS-REFERENCE TO RELATED APPLICATION

This is a U.S. National Stage Application filing under 35 U.S.C. 371 of International Application PCT/US12/62411, entitled "QUORUM-BASED VIRTUAL MACHINE SECURITY", filed on Oct. 29, 2012, which is incorporated by reference herein in its entirety.

BACKGROUND

Unless otherwise indicated herein, the materials described in this section are not prior art to the claims in this application and are not admitted to be prior art by inclusion in this section.

In modern data centers, numerous Virtual Machines (VMs), often associated with numerous data center customers, execute on numerous servers. It is also common for multiple VMs to execute on any one data center server. Virtual Machine Managers (VMMs) manage sharing of hardware resources, such as processor time, by VMs running on each data center server. Data centers also typically include load balancers and/or a variety of other related components that optimize use of hardware resources therein, for example by starting and terminating VMs to adapt to workloads, assigning VMs to available servers, and migrating VMs among servers.

VMs within a data center may be configured for any of a huge variety of tasks. Some VMs may support ecommerce, such as by providing product descriptions, prices, customer account information and payment processing services supporting an ecommerce website. Some VMs may support mobile applications such as news, sports, weather, and email feeds. Some VMs may support single- or multiplayer gaming applications. The variety of uses for VMs within data centers is very wide and continues to grow.

Furthermore, mainstream computer use is evolving from individually managed, stand-alone computing devices to connected devices that access software and/or data via a network connection. "Cloud computing" generally refers to a computing model in which computing resources may be accessed via a network connection. Resources available from the network may be referred to as "in the cloud". Behind a network connection, a "cloud" may comprise professionally managed hardware and software, which hardware and software is often in data centers.

Security is one important concern of customers considering deployment of their VMs and/or data within data centers, or otherwise considering deployments within the cloud. Potential security compromises include, for example, the malevolent capture of VM images during storage, capture of VM images during migration of VMs for load balance, or capture of VM images while moving data center customers from one data center to another. In some data centers, large numbers of VMs are available to copy in decrypted form, complete with access keys, for anyone who spends the time trying registration numbers at a web interface. In other situations VM images are vulnerable as they may be migrated as one piece, decrypted as one piece, and may sit in a single location within a data center for long periods of time. In one example attack, a series of web commands may be "replayed" to migrate a VM instance, resulting in generation of a copy of the VM instance being sent to the destination of the attacker's choice. Standard encryption of data within the VM image, in these cases, may be of minimal value since the VM typically contains the key to unlock its own data. As a result, there is a need in the art to provide effective security measures in data centers and/or other computing environments adapted for simultaneous execution of multiple VMs.

SUMMARY

The present disclosure generally describes technologies including devices, methods, and computer readable media relating to quorum-based VM security. Some example methods may be directed to securing data in a data center. Methods may include generating a set of decryption keys, for example by a security system in the data center; quorum-encrypting data using the set of decryption keys, such that more than one decryption key is needed to decrypt the quorum-encrypted data; and distributing the set of decryption keys to multiple VMs in the data center, such that each individual VM of the multiple VMs receives insufficient decryption keys to decrypt the quorum-encrypted data, while the multiple VMs as a group receive sufficient decryption keys to decrypt the quorum-encrypted data.

Some example methods may be directed to assembling decryption keys to decrypt quorum-encrypted data. Methods may include assembling, by a VM, a quorum of decryption keys to decrypt the quorum-encrypted data, and decrypting, by the VM, the quorum-encrypted data with the assembled quorum of decryption keys. Assembling the quorum of decryption keys may comprise determining a number of decryption keys to decrypt an item of quorum-encrypted data, such as a VM payload or other data item; sending decryption key requests for decryption keys for the item of quorum-encrypted data held by other VMs; receiving decryption keys for the item of quorum-encrypted data in response to the decryption key requests; and assembling the received decryption keys for the item of quorum-encrypted data as the quorum of decryption keys to decrypt the item of quorum-encrypted data when a number of received decryption keys is equal to or greater than the number of decryption keys to decrypt the item of quorum-encrypted data.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, and a data center security system and/or a VM as described in further detail herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
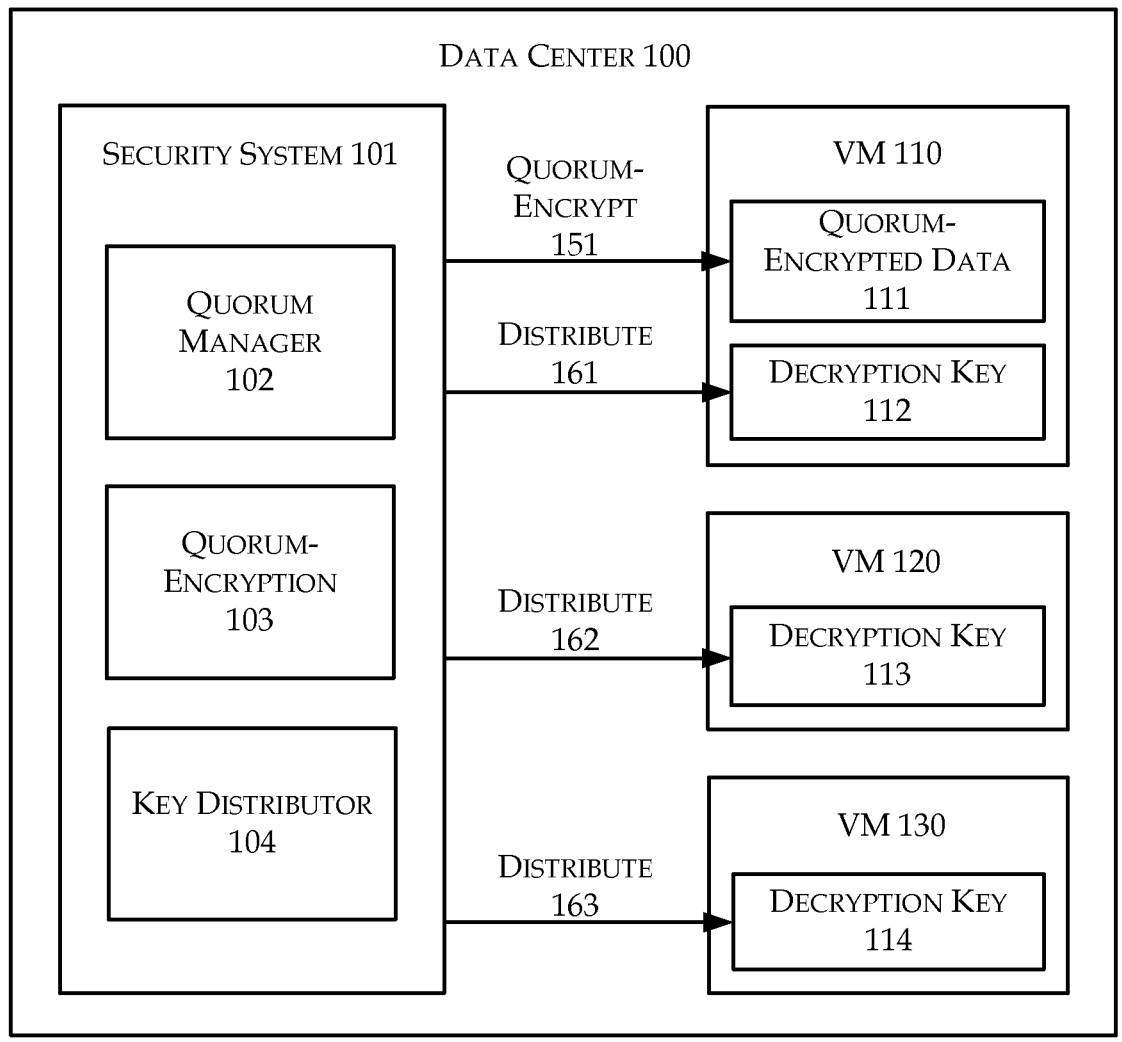
FIG. 1 is a block diagram illustrating an example data center comprising a security system configured to implement quorum-based VM security.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to quorum-based VM security. VM data, such as a VM payload or other VM data, may be quorum-encrypted, such that a quorum of decryption keys may be used to decrypt the data. Decryption keys may be distributed among multiple VMs, with different decryption keys provided to different VMs, so that single VMs may not decrypt the VM data without decryption keys held by other VMs. To decrypt its data, a VM may assemble a quorum of decryption keys by requesting decryption keys held by other operational VMs, and the VM may then decrypt its data using the assembled quorum of decryption keys. The VM may be prevented from decrypting its data without a sufficient quorum of other operational VMs.

In some embodiments, deployments of multiple VMs may be provided in which a quorum of VMs within the deployment may be operational before any VM can access its payload. Example implementations may include a keymaster process at each VM. Each keymaster may exchange decryption keys with other keymasters until an appropriate quorum is reached to decrypt VM payloads.

In some embodiments, each VM in a related group of VMs may be provided with a partial decryption key for its own data payload as well as partial decryption keys for payloads of other VMs in the group. As a result, each VM may be unable to decrypt its payload unless a quorum of VMs from the group is operational and the quorum of VMs is able to exchange partial decryption keys. Any single partial decryption key by itself may be insufficient to decrypt VM payloads without at least one of the other partial decryption keys. The number of decryption keys for a quorum can be any number greater than one. As a result, if a quorum-encrypted payload is stolen, the payload may not be decrypted without decryption keys held by other VMs. A thief who obtains a quorum-encrypted payload would be unable to decrypt it without also acquiring and running other VMs, or else reverse engineering multiple stolen VMs, which presents a significantly greater challenge than stealing a single VM payload.

Quorum-based VM security described herein need not impair the robustness of service oriented architectures. Failures of individual communications or individual VM instances need not cause problems for other VMs, as long as at least a quorum of VMs remains in operation. This aspect stands in contrast with solutions employing a single key server from which VM's may retrieve decryption keys. Single key server approaches have both a single point of failure and also present a centralized point of attack. While a key server may be provided with quorum decryption keys, e.g., along with VMs in some embodiments of this disclosure, weaknesses of single key server approaches may be nonetheless reduced or eliminated.

As introduced above, methods for securing data for a VM in a data center may include generating a set of decryption keys by a security system in the data center; quorum-encrypting data for the VM using the set of decryption keys, such that more than one decryption key is needed to decrypt the quorum-encrypted data; and distributing the set of decryption keys to multiple VMs in the data center, such that each individual VM of the multiple VMs receives insufficient decryption keys to decrypt the quorum-encrypted data, while the multiple VMs as a group receive sufficient decryption keys to decrypt the quorum-encrypted data.

The generating, quorum-encrypting, and distributing may be performed for data for use by any number of VMs in the data center. When applying methods disclosed herein to data for use by one VM, for example, the VM may be unable to decrypt its data without other operational VMs to supply decryption keys. Meanwhile, other VMs (in this example) may access their own data without assembling quorums of decryption keys.

When applying the method to data for use by multiple VMs, the generating, quorum-encrypting, and distributing may be performed for data for use by each of multiple VMs in the data center. As a result, each of the multiple VMs may be unable to decrypt its data without other operational VMs to supply decryption keys.

In some embodiments, a data center may be configured to apply quorum-based VM security separately to separate groups of VMs within data center. An example group of VMs may comprise VMs corresponding to a same data center customer. The VMs in the group may be supplied with decryption keys for use with quorum-encrypted data items for other VM's in the group, while the VMs in the group may not be supplied with decryption keys for decrypting data items for VM's outside the group.

In some embodiments, distributing the decryption keys may comprise distributing at least one of the decryption keys to the VM for which a data item is quorum-encrypted, to be stored within the VM and used as a local decryption key. The local decryption key may be a necessary member of any assembled quorum of decryption keys. The VM need not share its local decryption key with any other VMs, and therefore other VMs may be prevented from assembling a quorum sufficient to decrypt a data item belonging to the VM for which the data is quorum-encrypted.

Any number greater than one may be used as the number of decryption keys to decrypt the quorum-encrypted data (the quorum number). In general, the number of decryption keys set for a quorum may be set to provide desired security, wherein higher quorum numbers, comprising more decryption keys, distributed to more VMs, generally provide a higher security level than lower quorum numbers, comprising fewer decryption keys distributed to fewer VMs. However, the number of decryption keys set for a quorum (the quorum number) may also correspond to a number of VMs that are likely operable within a data center at all times, to avoid situations wherein a quorum cannot be assembled. Level of security may generally be weighed against computational overhead as well as risk tolerance for situations involving insufficient VMs to build a quorum.

In some embodiments, distributing decryption keys may comprise distributing more decryption keys to VMs in the data center associated with stronger security levels, relative to other VMs in the data center. For example, VMs associated with a known strong security level may each be provided with more than one decryption key, while VMs associated with a lower security levels, or unknown security levels, may each be provided with a single decryption key. Other numbers of decryption keys may be used, with more going to the higher security VMs, and fewer or none going to the lower security VMs. Using this approach, a smaller quorum of higher security VMs may be sufficient to assemble a quorum of VMs, while a larger quorum of lower security VMs may be sufficient to assemble a quorum of VMs. Mixed high security/low security VM scenarios may result in intermediate numbers of VMs to assemble a quorum of VMs. Also, it will be appreciated that in some embodiments, numbers of decryption keys provided to different VMs may be adjusted to effectively make the presence of at least one high-security VM a necessary member of any quorum.

In example embodiments wherein more decryption keys are distributed to VMs in the data center associated with stronger security levels, a VM image may be given a number of keys to hold that is commensurate with the perceived risk of corruption or capture. For example, VM instances that are run on untrusted hardware or colocated with dangerous processes may have few decryption keys, no decryption keys, or decryption keys to other lower security level VM instances. This allows the preservation of service oriented robustness while allowing different security tiers based on data and task and may be coupled with various ranks of security certificates.

In some embodiments, the data center security system may be configured to re-generate the set of decryption keys, re-quorum-encrypt the data for the VM, and re-distribute the decryption keys in response to a change in a security level associated with the VM. For example, to make a VM more secure, the data center security system may re-generate the set of decryption keys such that a larger number of decryption keys may be set for the quorum. Such an operation may take place as a precautionary measure in advance of migrating the VM, or otherwise in advance of performing an operation that involves increased security risk. For example, to address vulnerabilities while moving data center customers between facilities, such as performing live migrations which are particularly vulnerable, decryption keys may be re-generated such that numbers of decryption keys involved in quorums may be temporarily increased to thwart any attacks that may obtain multiple VM images. Control over the quorum numbers can also provide variable security in order to be responsive to security needs of particular VMs and/or groups of VMs.

In some embodiments, systems can be arranged such that access to a quorum of decryption keys is needed each time a quorum-encrypted data item is accessed, or at intervals, so that continuous maintenance of a quorum may be effectively needed in order for VMs within the quorum to continue to operate. This may be done for example by having a VM discard decryption keys after accessing quorum-encrypted data, and then assembling or re-assembling decryption keys in connection with another access to the quorum-encrypted data, or in connection with accessing a new quorum-encrypted data item.

In some embodiments, quorum-based VM security can be implemented as an applied wrapper, which is applied for example within a data center and is transparent to data center customers and/or VM coders. The security system in the data center, or some other component cooperating with the security system, may deploy a keymaster to each of the VMs, wherein the keymaster is configured to implement a keymaster process for assembling, on behalf of each of the VMs, the decryption keys to decrypt quorum-encrypted data. The keymaster may be configured to determine a number of decryption keys to decrypt an item of quorum-encrypted data; send decryption key requests for decryption keys for the item of quorum-encrypted data held by other VMs in the data center; receive decryption keys for the item of quorum-encrypted data in response to the decryption key requests; and assemble the received decryption keys for the item of quorum-encrypted data as a quorum of decryption keys to decrypt the item of quorum-encrypted data when a number of received decryption keys for the item of quorum-encrypted data is equal to or greater than the number of decryption keys to decrypt the item of quorum-encrypted data. The keymaster may furthermore be configured to receive a decryption key request for a decryption key to decrypt a different item of quorum-encrypted data by at least one other VM; and provide, in response to the received decryption key request, a decryption key for the different item of quorum-encrypted data from a decryption key collection for use by the at least one other VM.

Solutions described herein need not involve participation or knowledge of data center customers. In some embodiments, quorum-encrypted data may include entire VM instances, and the datacenter can "wrap" VM instances with keymaster processes and key collections. Datacenter security modules may be configured to automatically determine numbers of decryption keys and/or numbers of VMs for quorum security based on information establishing numbers of VM instances that are likely to always be operational, such as historical and/or characteristic data center usage data. In some embodiments, the data center may confirm numbers of VMs to be included in quorums with data center customers. In some embodiments, the data center may adaptively manage when to use quorum-based security and what quorum levels to use. In some embodiments, cloud computing based operating systems, such as Piston8 and other similar operating systems, may be configured to include keymaster processes and key collections according to this disclosure within the operating system, to allow users or datacenters to implement solutions according to this disclosure automatically on some or all new VM images.

As introduced above, some example methods may be directed to assembling decryption keys to decrypt quorum-encrypted data. Methods may include assembling, by a VM, a quorum of decryption keys to decrypt the quorum-encrypted data, and decrypting, by the VM, the quorum-encrypted data with the assembled quorum of decryption keys. Assembling the quorum of decryption keys may comprise determining a number of decryption keys to decrypt the quorum-encrypted data; sending decryption key requests for decryption keys held by other VMs; receiving decryption keys in response to the decryption key requests; and assembling the received decryption keys as the quorum of decryption keys to decrypt the quorum-encrypted data when a number of received decryption keys is equal to or greater than the number of decryption keys to decrypt the quorum-encrypted data. The VM and the other VMs may comprise VMs within a same data center, for example, the VM and the other VMs may correspond to a same data center customer.

In some embodiments, methods for assembling decryption keys to decrypt quorum-encrypted data may be carried out by a keymaster process, as described above. The keymaster may be supplied to the VM by the data center, or may be included natively within the VM.

In some embodiments, the VM may comprise a decryption key collection comprising decryption keys for use by the other VMs in decrypting other quorum-encrypted data. For example, each VM in a group of VMs may comprise a decryption key collection comprising decryption keys for use by other VMs in the group. Methods may include receiving a decryption key request and providing, in response to the received decryption key request, a decryption key from the decryption key collection for use by at least one other VM. Methods may also include receiving re-generated decryption keys for the decryption key collection, e.g., from a data center security module; and replacing decryption keys in the decryption key collection with the re-generated decryption keys.

In some embodiments, methods may include authenticating the received decryption key request, and providing the decryption key from the decryption key collection in response to the received decryption key request when the decryption key request is authenticated. Conversely, methods may include certifying outgoing decryption key requests to allow the other VMs to authenticate the outgoing decryption key requests.

In some embodiments, a VM may be configured to include, in an assembled quorum of decryption keys, a local decryption key stored within the VM. The local decryption key may optionally comprise a necessary member of any assembled quorum of decryption keys applied to decrypt the VM's data. In embodiments wherein one of the decryption keys involved in a quorum is an internal or local decryption key, such a local decryption key need not be sent or otherwise provided to other VMs. The local decryption key may be migrated with the VM when the VM is migrated in packed form. Because the local decryption key may be necessary for decrypting VM data, attackers may be prevented from accessing quorum-encrypted VM data without at least acquiring and operating the VM. As a result, deployments may be immune to network snooping and data-payload grabs. Moreover, if an attacker attempts to acquire and operate the VM, the attacker may need at least a quorum of VMs to be operational before the attacker would succeed in defeating the quorum-based VM security techniques disclosed herein. As a result, VMs and VM deployments can be also immune to VM instance grabs which acquire less than a quorum of VMs. In some embodiments, VM quorums may comprise "overlapping" VMs from multiple groups of VMs in a datacenter, or VM quorums may be large enough such that attackers may be forced to grab and run substantially an entire deployment in order to succeed in decrypting quorum-encrypted VM data.

In some embodiments, the decryption keys in the decryption key collection may themselves be encrypted. The decryption keys may be decryptable by a VM that uses the decryption keys to decrypt its payload, e.g., the decryption keys may be decryptable using the VM's local decryption key, to prevent VMs other than the intended VM from having useful decryption key information.

In an example implementation, a deployment may comprise of a series of VM instances. Each VM instance may include data which is quorum-encrypted, such that some quorum X of N existing decryption keys may be needed to decrypt the data. Each VM instance may also have a keymaster process and a key collection of decryption keys K. The decryption keys may be conventionally encrypted. When the deployment starts up, each keymaster process may respond to certified requests for decryption keys from other VM instances within the deployment. Each keymaster process may also request decryption keys to assemble a quorum. Assembled quorums of decryption keys may be used by each VM instance to decrypt quorum-encrypted data for each VM's main instance service.

For example, a first VM, referred to as VM(a), may assemble X different decryption keys K(a*) to decrypt VM(a)'s data, where * denotes a source VM for each decryption key. VM(a) may contribute its local decryption key, K(aa). A second VM, referred to as VM(b), may contribute K(ab), and a third VM, referred to as VM(c), may contribute K(ac), and so on.

In a similar manner, VM(a) may contribute K(ba) to VM(b), and VM(a) may contribute K(ca) to VM(c). In this manner the assembly of decryption keys may become service-oriented. The number of different decryption keys used in a quorum X can be set to any value, as desired to provide an appropriate balance of challenge to attackers, to capture or compromise X instances and get them running, with speed of operation and wait time tolerance levels. Likewise, solutions according to this disclosure may allow for simple corrective measures when a small number of VM instances are stolen. Decryption keys for stolen VM instances can be banned by the data center, or re-generated, without necessarily shutting down the running deployment. The distributed nature of solutions according to this disclosure preserves the robustness of service oriented computing.

In some example processes for running a VM in a deployment that implements quorum-based VM security as described herein, a keymaster may launch at VM start. The keymaster may send requests seeking relevant decryption keys to data used by the VM. Messaging may comprise direct https GET and POST actions or can involve the use of message passing services like the Amazon Web Services Simple Queue Service (SQS). The keymaster may receive decryption keys and then may either continue to request decryption keys, or proceed to decrypt its data when it has assembled a sufficient number of decryption keys. Meanwhile the keymaster may check for messages from other VMs, the messages seeking decryption keys held locally by the VM, e.g., in a key collection held by the VM. The keymaster may provide those locally held decryption keys for use by the other VMs. Additional steps may be employed for certifying and securing decryption key requests, such as public/private key encryption to certify that decryption key requests. The decryption keys stored in the key collection need not be used locally by the VM, so the storage format may be additionally encrypted so that only the appropriate VM can decrypt them.

FIG. 1 is a block diagram illustrating an example data center comprising a security system configured to implement quorum-based VM security, arranged in accordance with at least some embodiments of the present disclosure. An example data center 100 includes a security system 101, a VM 110, a VM 120, and a VM 130. Three VMs are illustrated in FIG. 1 for simplicity of explanation, however it will be appreciated by one of skill in the art, with the benefit of this disclosure, that more or fewer VMs may be included in some embodiments. Security system 101 includes a quorum manager 102, a quorum-encryption module 103, and a key distributor 104. VM 110 includes an item of quorum-encrypted data 111 and a decryption key 112. VM 120 includes a decryption key 113. VM 130 includes a decryption key 114. FIG. 1 also illustrates security system 101 performing a quorum-encrypt operation 151 to place quorum-encrypted data 111 at VM 110, a distribute operation 161 to place decryption key 112 at VM 110, a distribute operation 162 to place decryption key 113 at VM 120, and a distribute operation 163 to place decryption key 114 at VM 130.

With reference to FIG. 1, security system 101 may generally be configured to quorum-encrypt data on behalf of VMs, and distribute decryption keys to multiple different VMs. For example, security system 101 may be configured to generate a set of decryption keys comprising decryption keys 112, 113, and 114. Security system 101 may be configured to quorum-encrypt data using the set of decryption keys comprising decryption keys 112, 113, and 114, or any combination or sub-combination thereof, to produce quorum-encrypted data 111 for VM 110. A number of decryption keys within the set of decryption keys, for example, any two of decryption keys 112, 113, and 114 may be needed to decrypt quorum-encrypted data 111. Security system 101 may be configured to distribute multiple decryption keys from the set of decryption keys comprising decryption keys 112, 113, and 114 to multiple different VMs in data center 100, such as VM 110, VM 120, and/or VM 130, such that each individual VM receives insufficient decryption keys to decrypt quorum-encrypted data 111, while multiple VMs 110, VM 120, and/or VM 130 may receive sufficient decryption keys to decrypt quorum-encrypted data 111. For example, in FIG. 1, security system 101 distributes one decryption key to each VM, while two or more decryption keys may be sufficient to decrypt quorum-encrypted data 111. As a result, the decryption keys distributed to each VM may be insufficient to decrypt quorum-encrypted data 111, and therefore, cooperation between VMs may be needed to build a quorum of decryption keys sufficient to decrypt quorum-encrypted data 111.

Quorum manager 102 may be configured to perform a variety of management operations in connection with this disclosure. Quorum manager 102 may optionally be configured to perform operations including but not limited to: deploying keymasters, such as a keymaster 200 illustrated in FIG. 2, to VMs in data center 100; determining which data in data center 100 to quorum-encrypt; determining groups of VMs to which decryption keys may be distributed by key distributor 104; measuring numbers of VMs that either are operable or are likely to be operable within data center 100; measuring numbers of VMs that either are operable or are likely to be operable within particular groups of VMs within data center 100, such as groups of VMs associated data center customers; determining how many decryption keys to include in sets of decryption keys used for quorum-encryption; determining how many decryption keys from a set of decryption keys may be sufficient to establish a quorum effective to decrypt quorum-encrypted data; determining security levels of VMs in data center 100 and/or numbers of decryption keys to provide to VMs in data center 100; determining when conditions within data center 100 warrant re-generating decryption keys, re-encrypting quorum-encrypted data using the re-generated decryption keys, and re-distributing the re-generated decryption keys; and/or determining when conditions involving a VM in data center 100 warrant re-generating decryption keys, re-encrypting quorum-encrypted data using the re-generated decryption keys, and re-distributing the re-generated decryption keys.

With regard to deploying keymasters to VMs in data center 100, quorum manager 102 may be configured to provide keymasters to VMs, such as VM 110, VM 120, and VM 130. For example, quorum manager 102 may install keymaster components within VM operating systems, or as applications executable by VMs. In some embodiments, quorum manager 102 may be configured to "wrap" VMs with security features, wherein the security features may be transparent to the VMs and may for example execute prior to fully launching corresponding VMs. Keymasters may advantageously be deployed to VMs in this manner in some embodiments.

With regard to determining which data items in data center 100 to quorum-encrypt, quorum manager 102 may provide quorum-based security for any data. In some embodiments, quorum manager 102 may be configured to provide quorum-based security for data in response to VM requests that may identify data items to be quorum-encrypted. For example, VM 110 may request quorum-based security for some data items, which data items may comprise, for example, a payload comprising substantially all VM data for VM 110, or which data items may comprise any other data to which VM 110 may have modification privileges. In some embodiments, quorum manager 102 may be configured to provide quorum-based security for data items according to selection criteria, e.g., based on a security level, a security requirement, or another parameter of a VM and/or of data items within data center 100. The term "data item" as used herein refers to individual files as well as to collections of data items, which collections may comprise multiple files. In some cases, data items may comprise collections of related files, such as VM payloads.

In some embodiments, quorum manager 102 may be configured to provide quorum-based security for data for each of multiple VMs in data center 100, e.g., for each of VMs 110, 120, and 130, as described in connection with FIG. 3. For example, quorum manager 102 may be configured to provide quorum-based security for data for all or substantially all VMs within data center 100, or for each VM within a group of VMs within data center 100. Quorum manager 102 may be configured to provide quorum-based security for all or substantially all VM payloads within data center 100 or for all or substantially all VM payloads associated with VMs in a group of VMs within data center 100—such as a group of VMs owned by a same data center customer who may for example "opt in" to quorum-based security.

With regard to determining groups of VMs to which decryption keys may be distributed by key distributor 104, quorum manager 102 may be configured according to any of a variety of configuration options as will be appreciated with the benefit of this disclosure. In some embodiments, all or substantially all VMs in data center 100 may comprise a group of VMs to which decryption keys may be distributed by key distributor 104. Otherwise, VMs may be grouped at random or according to any shared characteristics. In some embodiments, quorum-based security may be offered as an option to data center customers and a group of VMs may correspond, e.g., to all or substantially all VMs associated with a data center customer or to VMs specified by the customer. Quorum manager 102 may be configured to identify VMs in data center having a particular characteristic, such as being associated with a particular data center customer, and include identified VMs in a quorum-based security group. Quorum manager 102 may be configured to provide identified VMs may be provided to key distributor 104 so that key distributor 104 may distribute decryption keys to the identified VMs.

With regard to measuring numbers of VMs that either are operable or are likely to be operable within data center 100 and measuring numbers of VMs that either are operable or are likely to be operable within particular groups of VMs within data center 100, such as groups of VMs associated with data center customers, quorum manager 102 may be configured according to any of a variety of configuration options as will be appreciated with the benefit of this disclosure. In some embodiments, quorum manager 102 may for example be configured to access data center 100 management database information, or to cooperate with a load balancer within data center 100 to measure numbers of VMs in data center 100 and/or in particular groups within data center 100.

With regard to determining how many decryption keys to include in a set of decryption keys used to quorum-encrypt a particular item of quorum-encrypted data, quorum manager 102 may be configured according to any of a variety of configuration options as will be appreciated with the benefit of this disclosure. In some embodiments, quorum manager 102 may be configured to establish a number of decryption keys to generate as a function of how many total VMs exist in data center 100, or as a function of how many total VMs exist in a group of VMs within data center 100. Such functions may provide, e.g., one decryption key per VM that is entitled to hold a decryption key to the item of quorum-encrypted data in its key collection. In some embodiments, multiple decryption keys may be generated for one or more VMs that are entitled to hold decryption keys to the item of quorum-encrypted data in a key collection. Quorum manager 102 may be configured to calculate a total number of decryption keys to generate for each item of quorum-encrypted data, and to supply numbers of decryption keys to quorum-encryption module 103. Quorum-encryption module 103 may be configured to quorum-encrypt items of data using the specified numbers of decryption keys determined by quorum manager 102.

Figure 2:
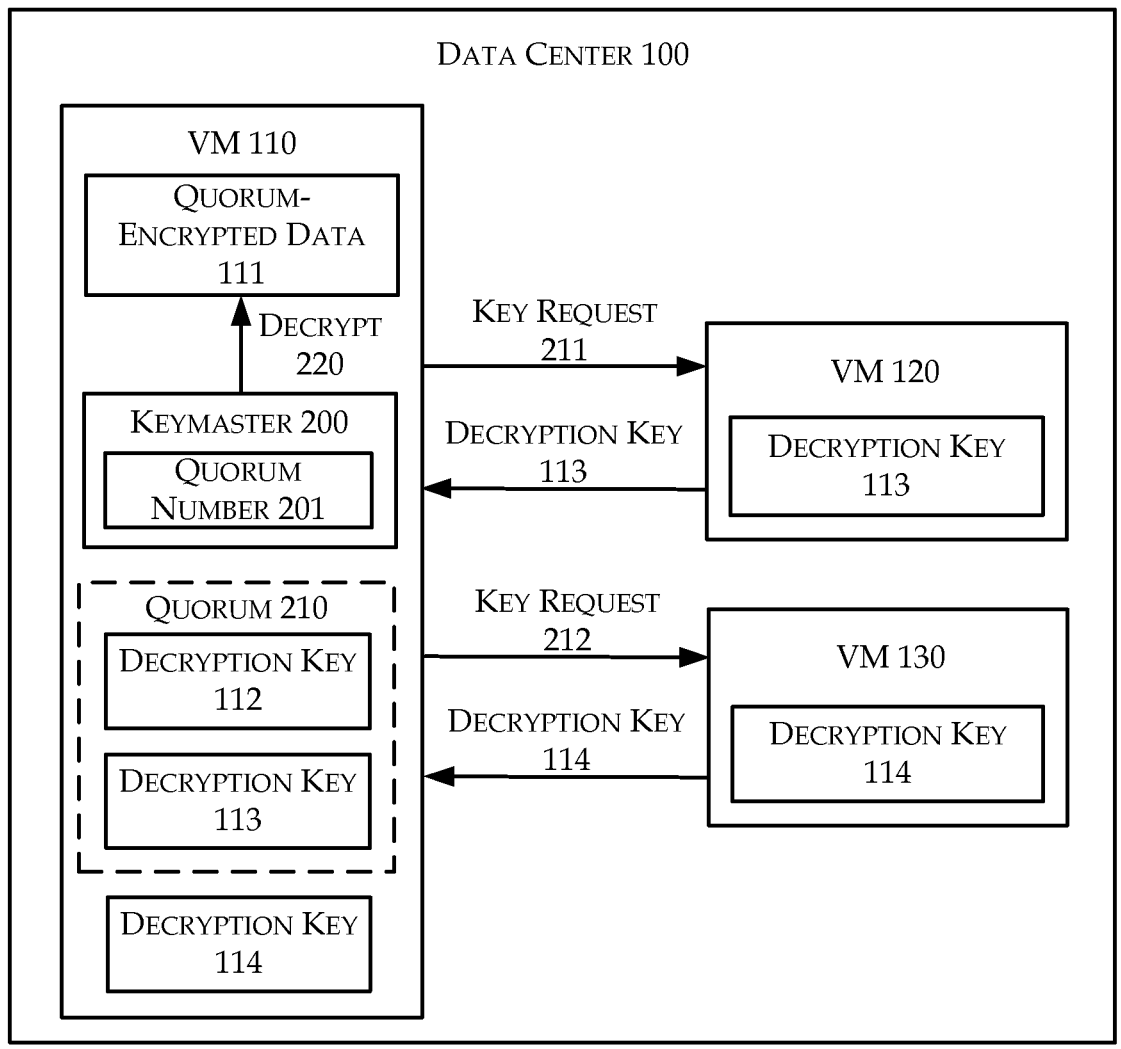
FIG. 2 is a block diagram illustrating an example VM configured to assemble a quorum of decryption keys to decrypt quorum-encrypted data.

With regard to determining how many decryption keys from a set of decryption keys may be sufficient to establish a quorum effective to decrypt an item of quorum-encrypted data, quorum manager 102 may be configured to set quorum numbers anywhere from a minimum of 2, that is, where 2 decryption keys from a set of two or more decryption keys may be used to decrypt quorum-encrypted data, to a maximum quorum number that is equal to the total number of decryption keys within a set of decryption keys. In general, using fewer decryption keys as the quorum number may result in easy assembly of quorums and low risk of situations in which a quorum may not be assembled, at the cost of possibly weaker quorum security. Using more decryption keys as the quorum number may result in more difficult assembly of quorums and higher risk of situations in which a quorum may not be assembled, with the benefit of possibly stronger quorum security. Quorum manager 102 may be configured to supply a quorum number to quorum-encryption module 103, and quorum-encryption module 103 may be configured to quorum-encrypt identified data such that the specified quorum number of decryption keys within a generated set of decryption keys are sufficient to decrypt quorum-encrypted data. In some embodiments, security system and/or quorum manager 102 may be configured to supply a quorum number to a VM, e.g., VM 110, for which data is encrypted, as shown in FIG. 2.

In some embodiments, quorum manager 102 may be configured to set quorum numbers as a function of measured numbers of VMs that either are operable or are likely to be operable within either data center 100 or a group of VMs within data center 100. For example, when 50 VMs within a deployment are likely to be operable at all times, quorum manager 102 may be configured to set the quorum number as some number less than or equal to 50, such as 2, 5, 10, 25, 35, or any other number less than or equal to 50. In some embodiments, quorum manager 102 may be configured to set the quorum number for example as a predetermined fraction of a measured number of VMs that are likely to be operable, which predetermined fraction may optionally depend the size of the measured number of VMs that are likely to be operable. For example, when 50 or less VMs are likely to be operable, quorum manager 102 may be configured to set the quorum number as one-half of the VMs that are likely to be operable, and when more than 50 VMs are likely to be operable, quorum manager 102 may be configured to set the quorum number as one-fourth of the VMs that are likely to be operable. Any fractions and any breakpoint numbers of VMs that are likely to be operable may be applicable for particular embodiments. In some embodiments, maximum and/or minimum quorum numbers may be established—for example, a minimum quorum number of 2 and a maximum quorum number of 25 may be used, regardless of how many VMs may be likely to be operable. In some embodiments, quorum manager 102 may be configured to set quorum numbers using data center VM statistics. For example, VM population statistics over time may be reviewed and the quorum number may be set to ensure that operable VM populations exceed the quorum number (or some multiple of the quorum number) 99.99% of the time. This can be done by actual comparison with time-series data or by setting the quorum number based on mean and standard deviations or any other numerical construct based on VM operations data or simulations.

In some embodiments, quorum manager 102 may be configured to set a quorum number according to a security level associated with a VM. For example, when the VM is associated with a low security level, a relatively lower quorum number may be set for data that is quorum-encrypted on behalf of the VM, relative to higher quorum numbers that may be used for VMs associated with higher security levels. For example, a quorum number for a low security level VM may comprise 30% of the decryption keys in a set of decryption keys distributed to VMs in a data center, or 30% or the VMs that are likely to be operational at all times, while a quorum number for a high security level VM may comprise 50% of the decryption keys in a set of decryption keys distributed to VMs in a data center, or 50% or the VMs that are likely to be operational at all times. These numbers are just one example, and other numbers may be used as will be appreciated. Conversely, when the VM is associated with a low security level, some embodiments may set a relatively higher quorum number for data that is quorum-encrypted on behalf of the VM—relative to lower quorum numbers that may be set for VMs associated with higher security levels. For example, a quorum number for a low security level VM may comprise 50% of the decryption keys in a set of decryption keys distributed to VMs in a data center, while a quorum number for a high security level VM may comprise 30% of the decryption keys in a set of decryption keys distributed to VMs in a data center. Such embodiments may for example be considered when high security level VMs are subject to sufficient other security precautions, such that lower quorum numbers may be warranted.

In some embodiments, quorum manager 102 may be configured to specify a number of necessary decryption keys that are to be generated by quorum-encryption module 103, and to provide to key distributor 104 distribution settings for the necessary decryption keys. Quorum-encryption module 103 may be configured to quorum-encrypt data such that the specified number of necessary decryption keys are produced, that is, such that quorum-encrypted data cannot be decrypted without at least the necessary decryption keys, optionally in combination with other decryption keys within an assembled quorum. For example, quorum-encryption module 103 may quorum-encrypt data, and quorum-encryption module 103 may generate a set of 50 decryption keys to decrypt the data, with a quorum number of 25, and including one (1) necessary decryption key. To decrypt the data, a VM would need the necessary decryption key along with any 24 of the other 50 decryption keys. Quorum-encryption module 103 may be configured to identify the necessary decryption keys to key distributor 104. Key distributor 104 may be configured to distribute any necessary keys according to the key distribution settings.

In another example, quorum manager 102 may specify that a set of 3 decryption keys, with a quorum number of 2, including one (1) necessary decryption key, is to be generated by quorum-encryption module 103 for quorum-encryption of data for VM 110. Quorum-encryption module 103 may quorum-encrypt the data to produce quorum-encrypted data 111, and quorum-encryption module 103 may generate the 3 decryption keys 112, 113, and 114, with a quorum number of 2, wherein decryption key 112 is the necessary decryption key. Because in this example the quorum number is 2, a quorum comprising the two decryption keys 112 and 113 or a quorum comprising the two decryption keys 112 and 114 would be sufficient to decrypt quorum-encrypted data 111. Quorum-encryption module 103 may provide all three decryption keys 112, 113, and 114 to key distributor 104, and the necessary decryption key 112 may be identified to key distributor 104. Quorum manager 102 may indicate to key distributor 104 that the necessary decryption key 112 for quorum-encrypted data 111 is to be distributed to VM 110. Key distributor 104 may be configured to distribute the necessary decryption key 112 to VM 110, and to distribute the various other decryption keys 113, 114 to VM 120 and VM 130. Decryption key 112 may be stored within VM 110 for use as a local decryption key. Local decryption key 112 may be a necessary member of any assembled quorum of decryption keys to decrypt quorum-encrypted data 111.

With regard to determining security levels of VMs in data center 100 and/or numbers of decryption keys to provide to VMs in data center 100, quorum manager 102 may be configured to determine security levels from any security related data in data center 100. In some embodiments, security levels may provide a measure of how strongly secured a VM may be, e.g., through the use of security precautions that may be applied within data center 100, such as certification requirements, encryption, execution environment requirements, and so on. In some embodiments, security levels may correspond to security sensitivity, e.g., VMs handling bank account login might be considered highly sensitive and therefore may be assigned a relatively high security level, while VMs managing online casual game sessions may be relatively less sensitive and therefore may be assigned a relatively low security level within data center 100. Security level information may be maintained within data center 100, for example in a table or other data structure that identifies VMs and/or VM types, and corresponding security levels.

In some embodiments, quorum manager 102 may be configured to determine numbers of decryption keys to provide to VMs in data center 100 based on the security level information. For example, quorum manager 102 may be configured to assign relatively more decryption keys to VMs in data center 100 that are associated with stronger security levels relative to other VMs in data center 100, such as VMs associated with relatively weaker security levels. By providing more decryption keys to VMs with stronger security, quorum assembly for subsequent decryption of quorum-encrypted data may involve cooperation from either fewer high-security VMs, or larger numbers of low-security VMs. For example, two high security VMs, each holding two decryption keys, may supply four decryption keys for decryption of quorum-encrypted data, while four low security VMs, each holding one decryption key, may alternatively supply four decryption keys, or one high security VM holding two decryption keys and two low security VMs, each holding one decryption key, may alternatively supply four decryption keys. In some embodiments, quorum manager 102 may be configured to provide VM identifiers along with numbers of decryption keys for each VM to key distributor 104, and key distributor 104 may be configured to distribute decryption keys accordingly, that is, by distributing more decryption keys to VMs in data center 100 associated with stronger security levels relative to other VMs in data center 100.

In some embodiments, quorum manager 102 may be configured to initiate re-quorum-encrypting data. Re-encryption may comprise, e.g., re-generating a set of decryption keys, re-quorum-encrypting data, and re-distributing decryption keys to VMs. Re-encryption may be initiated, for example, according to a routine maintenance/security schedule, for example by re-encrypting data once a month or once a year, or using some other time interval as appropriate. In some embodiments, re-encryption may be initiated in response to a change in a security level associated with a VM. For example, migrating a VM from one server to another server, regardless of whether the target server is inside or outside of data center 100, may subject the VM to security risk, or VM activities or access patterns may indicate security risk. Quorum manager 102 may be configured to initiate re-encryption operations prior to migrating the VM, or in response to detected suspicious or sensitive VM operations. Quorum manager 102 may furthermore adjust the number of decryption keys to include in the set of decryption keys, quorum number, and VMs to which decryption keys are distributed, as described herein, to accommodate the change in security level.

Quorum-encryption module 103 may be configured to quorum-encrypt data in data center 100. Any of the quorum-encryption techniques known in the art, or as may be developed, may be applied. In some embodiments, quorum-encrypting data may comprise encrypting the data according to a decryption key that is generated to have properties that are effective for splitting the decryption key into partial decryption keys such that a quorum of such partial decryption keys may be effective to decrypt the data. For example, in some quorum-encryption techniques, an encryption key quorum may comprise a minimum number of two or more key fragments to assemble an encryption key. In some embodiments, up to 75 key fragments can be safely generated, and the quorum number may be set to any number from 2 of the 75 fragments up to all 75 key fragments. In some embodiments, quorum-encrypting data may comprise generating elliptic equations for which a target intersection point can be calculated only with the benefit of a quorum of decryption keys sufficient to define one or more of the elliptic equations. Of course, other quorum-encryption techniques may be applicable and embodiments of this disclosure can employ any quorum-encryption technique.

In some embodiments, quorum-encryption module 103 may be configured to receive an identification of data to be encrypted, a total number of decryption keys, a quorum number, and/or a number of necessary decryption keys. For example, the above information may be supplied to quorum-encryption module 103 by quorum manager 102. Quorum-encryption module 103 may be configured to quorum-encrypt the identified data and to generate the total number of decryption keys, such that the identified data is decryptable with the quorum number of the decryption keys, including any necessary decryption keys. Necessary decryption keys may be generated, for example, by further encrypting quorum encrypted data with a necessary decryption key, e.g., using a secondary encryption process, or by encrypting one or more of the generated quorum decryption keys with a necessary decryption key. In some embodiments, necessary decryption keys may be generated by requiring a homomorphic transformation of one or more elements of the quorum encrypted and/or quorum decryption keys to generate a necessary decryption key. Secondary encryption processes can be applied directly to quorum encrypted data or to intermediate decryption keys. It will be appreciated that such multi-stage approaches can be used within the architectures described herein.

While any data in data center 100 may be identified for quorum-encryption, and any total number of decryption keys, any quorum number, and any number of necessary decryption keys may be specified, a specific example may illustrate operations of the quorum-encryption module 103. In this example, data to be encrypted may comprise payload data for VM 110, the total number of decryption keys may comprise three decryption keys, the quorum number may comprise two decryption keys, and the number of necessary decryption keys may comprise one decryption key. With this input data, quorum-encryption module 103 may be configured to quorum-encrypt the payload data for VM 110 to produce quorum-encrypted data 111, wherein any quorum of two out of the three total decryption keys, e.g., any two of decryption keys 112, 113, and 114 may be used to decrypt quorum-encrypted data 111, so long as the two decryption keys include necessary decryption key 112. Inclusion of necessary decryption keys is optional and in some embodiments, none of decryption keys 112, 113, and 114 need be a necessary decryption key.

Key distributor 104 may be configured to distribute decryption keys generated by quorum-encryption module 103 to VMs in data center 100. In some embodiments, key distributor 104 may be configured to provide a decryption key to each VM in data center 100, or to each VM within a group of VMs in data center 100. For example, as shown in FIG. 1, key distributor 104 may be configured to distribute decryption keys to each of VMs 110, 120, and 130. In some embodiments, key distributor 104 may be configured to distribute necessary decryption key(s) to identified VMs. For example, key distributor 104 may be configured to distribute necessary decryption key 112 to VM 110, for use as a local decryption key to be included in quorums assembled by VM 110 to decrypt quorum-encrypted data 111. In some embodiments, key distributor 104 may be configured to distribute more or fewer decryption keys to different VMs, e.g., by distributing some first number of decryption keys to VM 110, while distributing some second number of decryption keys, different from the first number, to VM 120, and/or distributing some third number of decryption keys, different from the first and second numbers, to VM 130.

FIG. 2 is a block diagram illustrating an example VM configured to assemble a quorum of decryption keys to decrypt quorum-encrypted data, arranged in accordance with at least some embodiments of the present disclosure. FIG. 2 includes data center 100, including VM 110, VM 120, and VM 130. VM 110 includes quorum-encrypted data 111, decryption key 112, decryption key 113, and decryption key 114. Decryption keys 112 and 113 are illustrated within a quorum 210. VM 110 also includes keymaster 200, and keymaster 200 includes a quorum number 201.

With reference to FIG. 2, VM 110 may generally be configured to assemble a quorum of decryption keys by requesting decryption keys held by other VMs in data center 100, and to use the assembled quorum of decryption keys to decrypt quorum-encrypted data 111. For example, keymaster 200 may be configured to assemble quorums of decryption keys and to decrypt quorum-encrypted data 111 on behalf of VM 110. Through deployment of keymaster 200 or otherwise, VM 110 may be configured to assemble quorum 210 comprising decryption keys 112 and 113, to decrypt quorum-encrypted data 111. Assembling quorum 210 may comprise: determining a number of decryption keys, such as quorum number 201; sending decryption key requests, such as key request 211 and key request 212, for decryption keys 113 and 114 held by other VMs such as VM 120 and VM 130; receiving decryption keys 113 and 114 in response to decryption key requests 211 and 212; and assembling received decryption keys including either of 113 and/or 114 as quorum 210 to decrypt quorum-encrypted data 111 when a number of received decryption keys is equal to or greater than quorum number 201. VM 110 may be configured to decrypt quorum-encrypted data 111 with assembled quorum 210, e.g., through decrypt operation 220 which may be performed or initiated by keymaster 200 in some embodiments.

Figure 3:
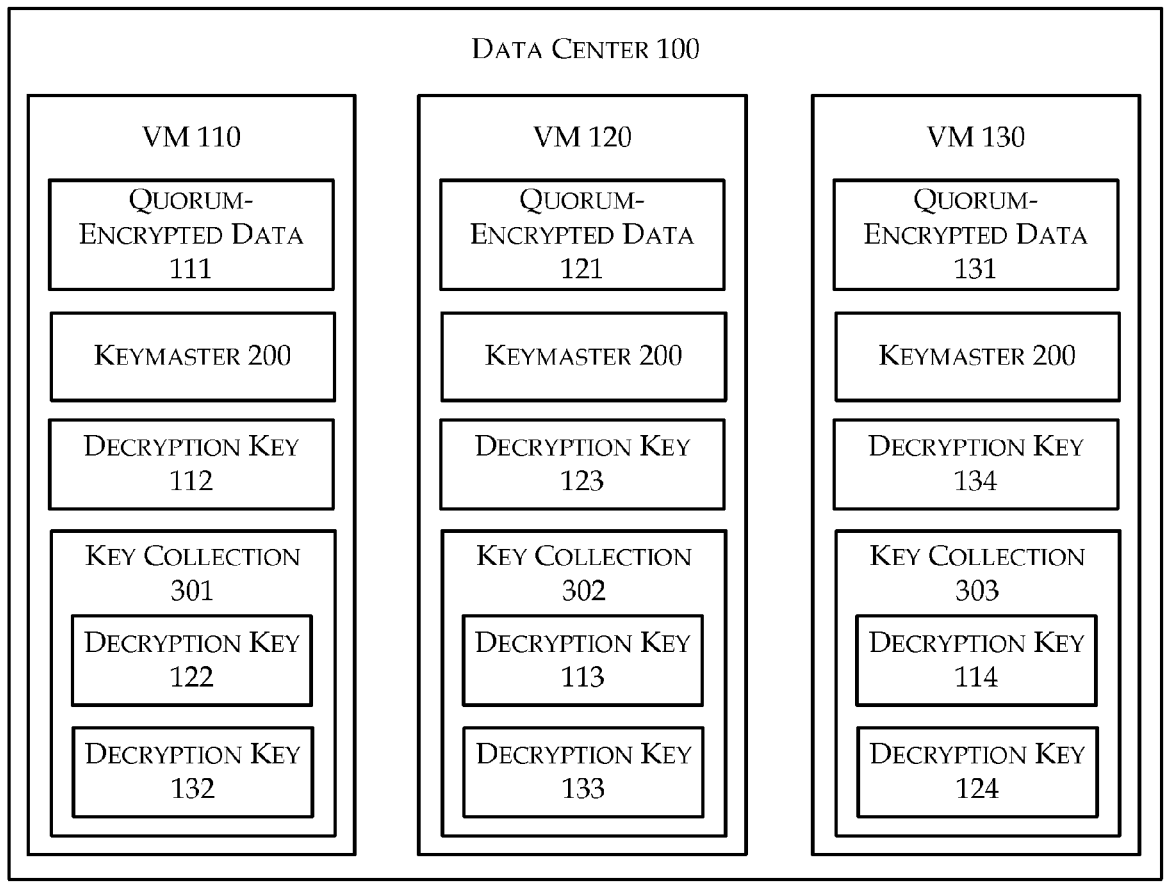
FIG. 3 is a block diagram illustrating multiple VMs, each VM having quorum-encrypted data and decryption keys for use in decrypting quorum-encrypted data held by other VMs.

FIG. 3 is a block diagram illustrating multiple VMs, each VM having quorum-encrypted data and decryption keys for use in decrypting quorum-encrypted data held by other VMs, arranged in accordance with at least some embodiments of the present disclosure. FIG. 3 includes VM 110, VM 120, and VM 130. VM 110 includes quorum-encrypted data 111, keymaster 200, decryption key 112, and a key collection 301. Key collection 301 comprises a decryption key 122 and a decryption key 132. VM 120 includes an item of quorum-encrypted data 121, a keymaster 200, a decryption key 123, and a key collection 302. Key collection 302 comprises decryption key 113 and a decryption key 133. VM 130 includes an item of quorum-encrypted data 131, a keymaster 200, a decryption key 134, and a key collection 303. Key collection 303 comprises decryption key 114 and a decryption key 124.

With reference to FIG. 3, multiple VMs within data center 100 may have quorum-encrypted data, and the VMs may be configured to decrypt such data by assembling quorums of decryption keys, similar to operations of VM 110 described in connection with FIG. 2. For example, VM 110 may comprise quorum-encrypted data 111, VM 120 may comprise quorum-encrypted data 121, and VM 130 may comprise quorum-encrypted data 131. Quorum-encrypted data 111 may be decryptable by quorum 210 of decryption keys comprising two or more of decryption keys 112, 113, and 114, as described in connection with FIG. 2. Similarly, quorum-encrypted data 121 may be decryptable by a quorum of decryption keys comprising two or more of decryption keys 122, 123, and 124, and quorum-encrypted data 131 may be decryptable by a quorum of decryption keys comprising two or more of decryption keys 132, 133, and 134.

VMs 110, 120, and 130 may each comprise a key collection, e.g., key collection 301, key collection 302, and key collection 303, wherein the key collections may comprise decryption keys for use by the other VMs in assembling their quorums for decrypting their quorum-encrypted data. VMs 110, 120, and 130 may each optionally comprise local decryption keys, such as decryption key 112, decryption key 123, and decryption key 134, held by VM 110, VM 120, and VM 130, respectively, for use within assembled quorums for decrypting a VM's own quorum-encrypted data 111, 121, and 131, respectively, and wherein local decryption keys 112, 123, and 134 may not be distributed to other VMs. VMs 110, 120, and 130 may each comprise instances of keymaster 200, where each instance of keymaster 200 may be configured to manage quorum assembly, key distribution, and data decryption on behalf its corresponding VM.

In some embodiments, keymasters 200 in each of VMs 110, 120, and 130 may be configured to load automatically during VM initialization, to decrypt VM quorum-encrypted VM payloads. In some embodiments, VMs 110, 120, and 130 may be configured to automatically load keymasters 200 to decrypt quorum-encrypted data, e.g., in response to an attempt to access quorum-encrypted data. In some embodiments, keymasters 200 may be manually started, e.g. by a human user selecting a keymaster application from a UI, and data to be decrypted may also be identified by the human user via the UI.

Once loaded, keymasters 200 may be configured to automatically attempt to assemble a quorum of decryption keys to decrypt any quorum-encrypted data to which keymasters 200 may be directed. For example, the keymaster in VM 110 may attempt to assemble a quorum of decryption keys for quorum-encrypted data 111, the keymaster in VM 120 may attempt to assemble a quorum of decryption keys for quorum-encrypted data 121, and the keymaster in VM 130 may attempt to assemble a quorum of decryption keys for quorum-encrypted data 131. Each keymaster 200 may for example send decryption key requests for decryption keys held by other VMs. For example, the keymaster in VM 110 may send decryption key requests for decryption keys held by VM 120 and VM 130, the keymaster in VM 120 may send decryption key requests for decryption keys held by VM 110 and VM 130, and the keymaster in VM 130 may send decryption key requests for decryption keys held by VM 110 and VM 120.

Decryption key requests may optionally identify a VM requesting the decryption key, the quorum-encrypted data to be decrypted, specific decryption keys, and/or other information allowing VMs to identify the requested decryption key(s) within their decryption key collections 301, 302, and 303. When VMs are operational they may be configured, via their keymaster process or otherwise, to provide requested decryption keys in response to decryption key requests. When VMs are not operational, they may generally be unavailable to respond to decryption key requests. To provide requested decryption keys, VMs may be configured to identify requested decryption keys within their key collection, and to supply identified decryption keys to the requesting VM.

For example, in response to a decryption key request from VM 110, VM 120 may be configured to identify decryption key 113 in its key collection 302, and to supply decryption key 113 to VM 110. Similarly, in response to a decryption key request from VM 110, VM 130 may be configured to identify decryption key 114 in its key collection 303, and to supply decryption key 114 to VM 110. In another example, in response to a decryption key request from VM 130, VM 120 may be configured to identify decryption key 133 in its key collection 302, and to supply decryption key 133 to VM 130. Similarly, in response to a decryption key request from VM 130, VM 110 may be configured to identify decryption key 132 in its key collection 301, and to supply decryption key 132 to VM 130.

In some embodiments, decryption keys in a decryption key collection such as 301, 302, or 303 may be encrypted. Decryption keys may for example be encrypted by security system 101 prior to distribution to VMs. Security system 101 may be configured to provide a key for decrypting decryption keys to VMs. For example, security system 101 may be configured to encrypt decryption keys 122 and 124 with decryption key 123. VM 110 may store decryption key 122 in encrypted form and may provide decryption key 122 in encrypted form to VM 120, in response to a decryption key request as discussed herein. Similarly, VM 130 may store decryption key 124 in encrypted form and may provide decryption key 124 in encrypted form to VM 120, in response to a decryption key request as discussed herein. VM 120 may be configured to decrypt received decryption keys 122 and 124 in addition to including decryption keys 122 and 124 in a quorum that can be used to decrypt quorum-encrypted data 121. By encrypting keys in this manner, in some embodiments unencrypted key information may be limited to VMs that have a valid need for such information.

In some embodiments, VMs 110, 120, and 130 may be configured to certify outbound decryption key requests, and conversely, to authenticate inbound decryption key requests. For example, VM 110 may digitally sign its decryption key requests prior to sending them to VM 120 and VM 130. A public/private key architecture may be used in some embodiments, whereby VM 110 may for example sign decryption key requests using a private key, and VMs 120 and 130 may use a corresponding public key to decrypt decryption key requests from VM 110, thereby authenticating that the decryption key requests actually originated from VM 110. VMs 120 and 130 may be configured to provide decryption keys 113 and 114 from their decryption key collections 302 and 303 in response to the received decryption key requests when the decryption key requests can be authenticated. Conversely, when the decryption key requests cannot be authenticated, VMs 120 and 130 may be configured to report an error to VM 110 and/or to security system 101.

A keymaster, e.g., keymaster 200 in VM 110 may be configured to receive decryption keys in response to its decryption key requests, and to assemble the received decryption keys into a quorum to decrypt quorum-encrypted data 111. In some embodiments, keymaster 200 in VM 110 may be configured to include, in the assembled quorum of decryption keys, a local decryption key stored within VM 110, such as decryption key 112.

In some embodiments, keymasters 200 may each include a quorum number, similar to quorum number 201 illustrated in FIG. 2. Quorum numbers may be provided to VMs 110, 120, and 130, e.g., by security system 101 along with keymasters 200 and/or along with quorum-encrypted data. In some embodiments, quorum numbers may be included with quorum-encrypted data, for example as unencrypted metadata, and keymasters 200 may be configured to determine quorum numbers by accessing the metadata. In some embodiments, keymasters 200 may be configured to access a service, e.g., a service provided by security system 101, to determine a quorum number for quorum-encrypted data. In this disclosure, "determining a quorum number" may include accessing a quorum number from an internal source within a VM, such as a quorum number previously provided to a VM and/or a quorum number in metadata associated with quorum-encrypted data, as well as accessing a quorum number from a source external to a VM, such as from a security system service.

Keymasters 200 may be configured to determine when a number of received decryption keys meets or exceeds an applicable quorum number. When the number of received decryption keys is less than the applicable quorum number, a keymaster may continue to send decryption key requests and/or wait for additional decryption keys responsive to previous decryption key requests. When the number of received decryption keys meets or exceeds the applicable quorum number, a keymaster may be configured to assemble a quorum of decryption keys, the quorum containing at least the quorum number of decryption keys as well as any necessary decryption keys. The keymaster may be configured to proceed to decrypt quorum-encrypted data using the assembled quorum. Decryption may be performed by the keymaster itself or by initiating a quorum decryption module and passing the assembled quorum to the quorum decryption module.

In some embodiments, keymasters 200 may be configured to "forget" or otherwise discard decryption keys included in an assembled quorum used for quorum decryption under certain circumstances. For example, keymasters 200 may be configured to discard decryption keys when a VM shuts down, when a VM migrates to another computing device, after a period of time, and/or after a decryption operation. In embodiments in which decryption keys are discarded, subsequent quorum assembly may be performed by VMs to again access any quorum-encrypted data. In some embodiments, VMs may be configured to re-quorum-encrypt any data, including changes or modifications to the data and to store the re-encrypted data prior to discarding decryption keys included in an assembled quorum.

In addition to quorum assembly and decryption functions, in some embodiments, keymasters 200 may be configured to manage decryption key collections 301, 302, and 303. Each time security system 101 quorum-encrypts new data, or re-encrypts data, security system 101 may distribute decryption keys to keymasters 200. For example, keymasters 200 may be configured to receive decryption keys and insert them into a local decryption key collection. Keymasters 200 may be configured to maintain a table or other data structure for their local decryption key collections, the data structure containing decryption key information that may be used to look up decryption keys in response to decryption key requests. Keymasters 200 may be configured to receive re-generated decryption keys for the decryption key collection, and to replace decryption keys in the decryption key collection with the re-generated decryption keys.

It is noted that while the VMs 110, 120, and 130 are illustrated within a same data center 100, and VMs 110, 120, and 130 may optionally correspond to a same data center customer as described herein, it will be appreciated with the benefit of this disclosure that in some embodiments, VMs 110, 120, and 130 could be distributed across multiple data centers or indeed, VMs 110, 120, and 130 may exist on any device or multiple devices of any type.

Figure 4:
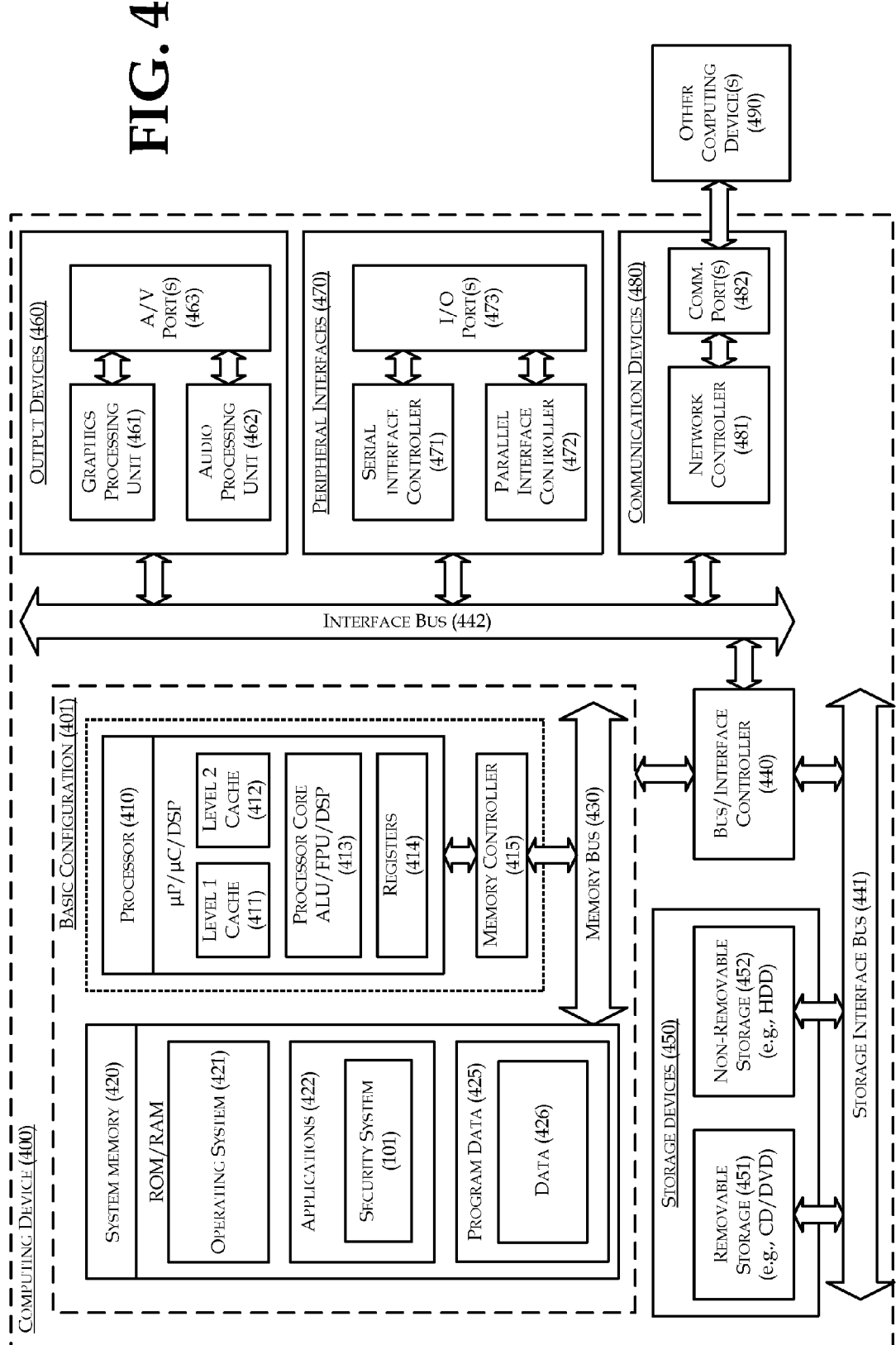
FIG. 4 is a block diagram of a computing device as one example of a security system server in a data center.

FIG. 4 is a block diagram of a computing device 400 as one example of a security system server in a data center, arranged in accordance with at least some embodiments of the present disclosure. In a very basic configuration 401, computing device 400 may include one or more processors 410 and system memory 420. A memory bus 430 may be used for communicating between the processor 410 and the system memory 420.

Depending on the desired configuration, processor 410 may be of any type including but not limited to a microprocessor ($\mu$P), a microcontroller ($\mu$C), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 may also be used with the processor 410, or in some implementations the memory controller 415 may be an internal part of the processor 410.

Figure 6:
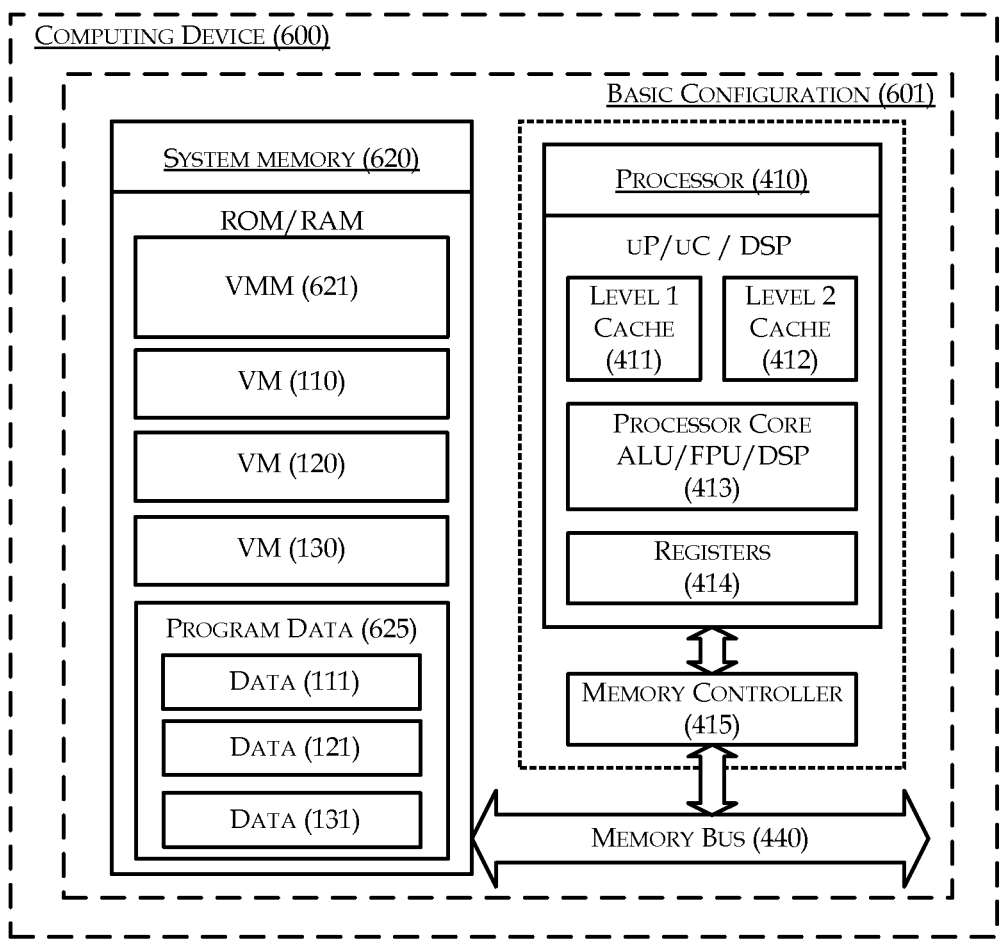
FIG. 6 is a block diagram of a computing device as one example of a VM server in a data center.

Depending on the desired configuration, the system memory 420 may be of any type including but not limited to volatile memory (such as RAM), non-volatile memory (such as ROM, flash memory, etc.), or any combination thereof. System memory 420 typically includes an operating system 421, one or more applications 422, and program data 425. Applications 422 may include, for example, security system module(s) 101. Program data 425 may include data 426 that may be used by security system module(s) 101, such as VM identification and property data, VM measurement data, and any other data that may be used in the course of operations of security system 101 as described herein. In some embodiments, security system 101 may be implemented within a particular data center customer's deployment, e.g., among any of multiple VMs deployed on behalf of particular data center customer, and security system 101 may be configured to manage quorum encryption for the deployment. For example, security system 101 may be implemented in VM 110 as illustrated in FIG. 6. In some embodiments, security system 101 may be implemented within a VM reference image in data center 100. In some embodiments, security system 101 may be implemented in a security layer which may be installed by a data center customer, or security system 101 may be implemented in software offered as a service by a service provider that supplies security services to data center customers.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 411, level 2 cache 412, system memory 420, removable storage 451, and non-removable storage devices 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 400. Any such computer storage media may be part of device 400.

Computing device 400 may also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 may include a serial interface controller 471 or a parallel interface controller 472, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 473. Other conventional I/O devices may be connected as well such as a mouse, keyboard, and so forth. An example communications device 480 includes a network controller 481, which may be arranged to facilitate communications with one or more other computing devices 490 over a network communication via one or more communication ports 482.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 400 may be implemented as an administrative server in data center 100. Computing device 400 may also be implemented as a server configured to manage quorum-based VM security involving VMs outside of data center 100. In embodiments wherein security system 101 is implemented within a VM, such as within VM 110, computing device 400 may be effectively implemented by a VM server in data center 100, such as illustrated in FIG. 6. Computing device 400 may also be implemented as a personal or business use computer including both laptop computer and non-laptop computer configurations, which may for example host multiple VMs subject to quorum-based VM security as described herein.

Figure 5:
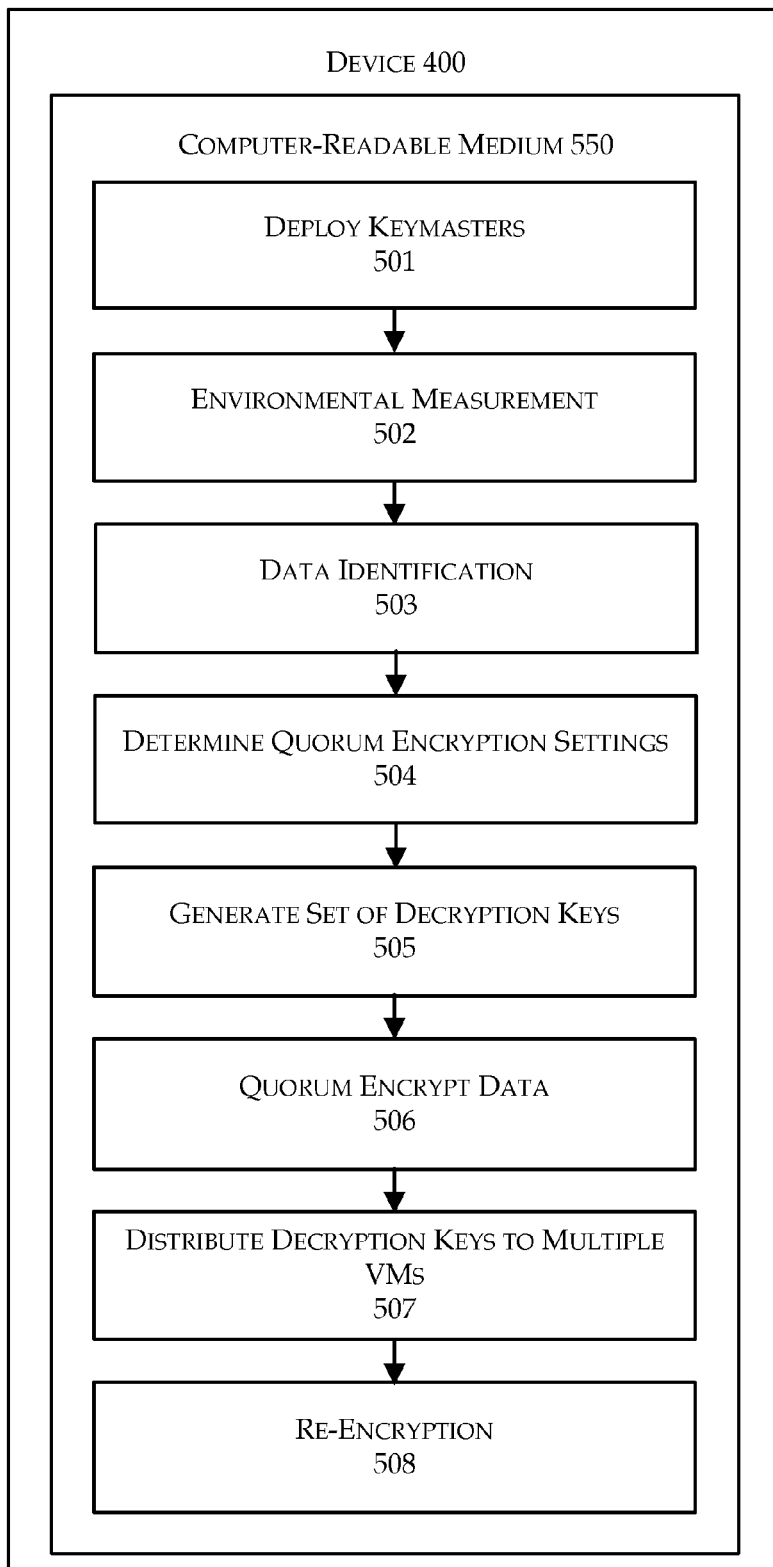
FIG. 5 is a flow diagram illustrating example methods for securing data for VMs in a data center.

FIG. 5 is a flow diagram illustrating example methods for securing data for VMs in a data center, arranged in accordance with at least some embodiments of the present disclosure. The example flow diagram may include one or more operations/modules as illustrated by blocks 501-508, which represent operations as may be performed in a method, functional modules in a device 400, and/or instructions as may be recorded on a computer readable medium 550.

In FIG. 5, blocks 501-508 are illustrated as being performed sequentially, with block 501 first and block 508 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 illustrates example methods by which security system 101 at computing device 400 may deploy quorum-based VM security within data center 100, or otherwise, within any computing environment comprising multiple VMs. In general, computing device 400 may optionally set up quorum-based VM security by deploying keymasters and performing environmental measurements. Once quorum-based VM security is set up, computing device 400 may identify data to be quorum-encrypted, determine quorum-encryption settings, and quorum-encrypt the data and distribute the decryption keys according to the quorum-encryption settings.

At a "Deploy Keymasters" block 501, computing device 400 may deploy keymasters 200 to VMs 110, 120, and 130 within data center 100. In some embodiments, block 501 may comprise deploying keymasters 200 as an applied wrapper that is executed in connection with VM start-up. In some embodiments, block 501 may comprise installing keymasters in VM operating systems or as an application within VMs. Keymasters may be deployed to all VMs in a given computing environment, such as data center 100, or keymasters may be deployed to select VMs to which quorum-based VM security is deployed. Block 501 may be followed by block 502.

At an "Environmental Measurement" block 502, computing device 400 may measure a total number of VMs included in any group of VMs to which quorum-based VM security is deployed. Computing device 400 may also measure a number of VMs in the group of VMs that are likely to be operational. Additional information, such as security level information associated with VMs in the group of VMs, may also be measured or gathered. Block 502 may be followed by block 503.

At a "Data Identification" block 503, computing device 400 may identify data to be quorum-encrypted. In some embodiments, the data may comprise all or substantially all VM payloads in the group of VMs to which quorum-based VM security is deployed. In some embodiments, computing device 400 may first identify a first VM payload, or other first data, for quorum-encryption, and may then perform blocks 504-507 for the identified first VM payload. Computing device 400 may then return to block 503 to identify a second VM payload, or other second data, and again proceed though blocks 504-507. Computing device 400 may return to block 503 and cycle through blocks 503-507 for each separate item of data that is to be separately quorum-encrypted. Items of data to be quorum-encrypted may be identified by a pointer to a memory location where the data item is stored, e.g., a memory location on a server hosting a VM. In some embodiments, data items may be imported to computing device 400 for quorum-encryption, and then returned to any appropriate location when quorum-encryption is complete. In embodiments comprising security system 101 within a customer deployment or within a VM such as VM 110, encryption functions may be run locally on the subject VM 110 and may for example encrypt data in local memory accessible by VM 110. Block 503 may be followed by block 504.

At a "Determine Quorum-Encryption Settings" block 504, computing device 400 may determine quorum-encryption settings for the data identified in block 503. Quorum-encryption settings may include, inter alia, a total number of quorum-encryption keys to be generated, a quorum number, and/or a number of necessary decryption keys. Quorum-encryption settings may also include decryption key distribution settings, such as identifications of VMs to distribute the decryption keys to, how many decryption keys to provide to each VM, and identifications of VMs to distribute necessary decryption keys to. Block 504 may be followed by block 505.

At a "Generate Set of Decryption Keys" block 505, computing device 400 may generate a set of decryption keys according to settings generated at block 504. Computing device 400 may for example generate a total number of decryption keys according to the encryption settings, such that given the quorum number of decryption keys specified in the encryption settings, including any necessary decryption keys also specified in the encryption settings, the remainder of the decryption keys may be generated. Block 505 may be followed by block 506.

At a "Quorum-Encrypt Data" block 506, computing device 400 may quorum-encrypt the data identified at block 503 with the set of decryption keys generated at block 505. Any quorum-encryption technique known in the art or as may be developed in the future may be used. The resulting quorum-encrypted data item may be stored at any appropriate location. For example, when the quorum-encrypted data item comprises a VM payload in a data center, the quorum-encrypted data may be stored at a server in the data center that may be currently hosting the VM. In embodiments wherein security system 101 and/or portions of security system 101 are implemented within a VM such as VM 110, decryption keys may be generated at the location of encryption, e.g., at VM server 600, and quorum-encrypted data may be stored locally, e.g. in a local memory accessible from VM server 600. Block 506 may be followed by block 507.

At a "Distribute Decryption Keys to Multiple VMs" block 507, computing device 400 may distribute the set of decryption keys generated at block 505 to VMs or keymasters, as specified in distribution settings generated at block 505. Computing device 400 may for example distribute a necessary decryption key to a VM for which the data identified in block 503 was encrypted, for use as the VM's local decryption key. In some embodiments, computing device 400 may distribute more decryption keys to some VMs than to others, e.g., as a function of differing security levels of differing VMs, as described herein. Block 507 may be followed by block 508.

At a "Re-Encryption" block 508, computing device 400 may re-quorum-encrypt data in response to any of a variety of circumstances as described herein. In the case of re-encrypting data as a routine security precaution or routine maintenance operation, block 508 may identify a data item for re-encryption and supply a data item identification to block 503. Blocks 503-507 may be performed using similar quorum-encryption settings as may have previously been established at block 504. In the case of re-encrypting data to increase security of the data, e.g., when a VM will be migrated or may otherwise be subject to increased security risk, block 508 may supply a data item identification to block 503 as well as encryption settings to block 504. For example, block 508 may supply a "large" quorum number to be used by block 504, where "large" is used herein to describe a quorum number larger than may otherwise, or larger than may typically be applied by block 504.

FIG. 6 is a block diagram of a computing device as one example of a VM server in a data center, arranged in accordance with at least some embodiments of the present disclosure. Devices according to FIG. 6 may generally comprise similar hardware and software to that introduced in connection with FIG. 4, and so aspects of FIG. 4 are omitted from FIG. 6 to avoid redundancy of description. Similar to FIG. 4, in a basic configuration 601, computing device 600 may include one or more processors 410 and a system memory 620. A memory bus 430 may be used for communicating between processor 410 and system memory 620. Elements of processor 410 are introduced in FIG. 4, where like elements are assigned like identifiers.

In VM server devices according to FIG. 6, system memory 620 may include a VMM 621, VMs such as VM 110, VM 120, and/or VM 130 and program data 625, which may include quorum-encrypted data 111, 121, and/or 131, as well as decrypted versions thereof, where decrypted versions of quorum-encrypted data 111, 121, and/or 131 may be produced by decrypting quorum-encrypted data 111, 121, and/or 131 according to the techniques described herein. System memory 620 may further include any of the processes or data illustrated in FIG. 3, such as keymasters 200, decryption keys 112, 123, and/or 134, and key collections 310, 302 and/or 303.

In some embodiments, computing device 600 may comprise security system 101 in addition to VMs 110, 120, and/or 130. In some embodiments, computing device 600 may be communicatively coupled with a device such as computing device 400, allowing security system 101 at device 400 to interact with VMs 110, 120, and/or 130, e.g., by quorum-encrypting data at device 600 and distributing decryption keys to VMs 110, 120, and/or 130. In some embodiments, computing device 600 may be communicatively coupled with additional VM server devices hosting additional VMs which may interact with VMs 110, 120, and/or 130, e.g. by requesting decryption keys held by VMs 110, 120, and/or 130 or providing decryption keys in response to decryption key requests from VMs 110, 120, and/or 130.

Figure 7:
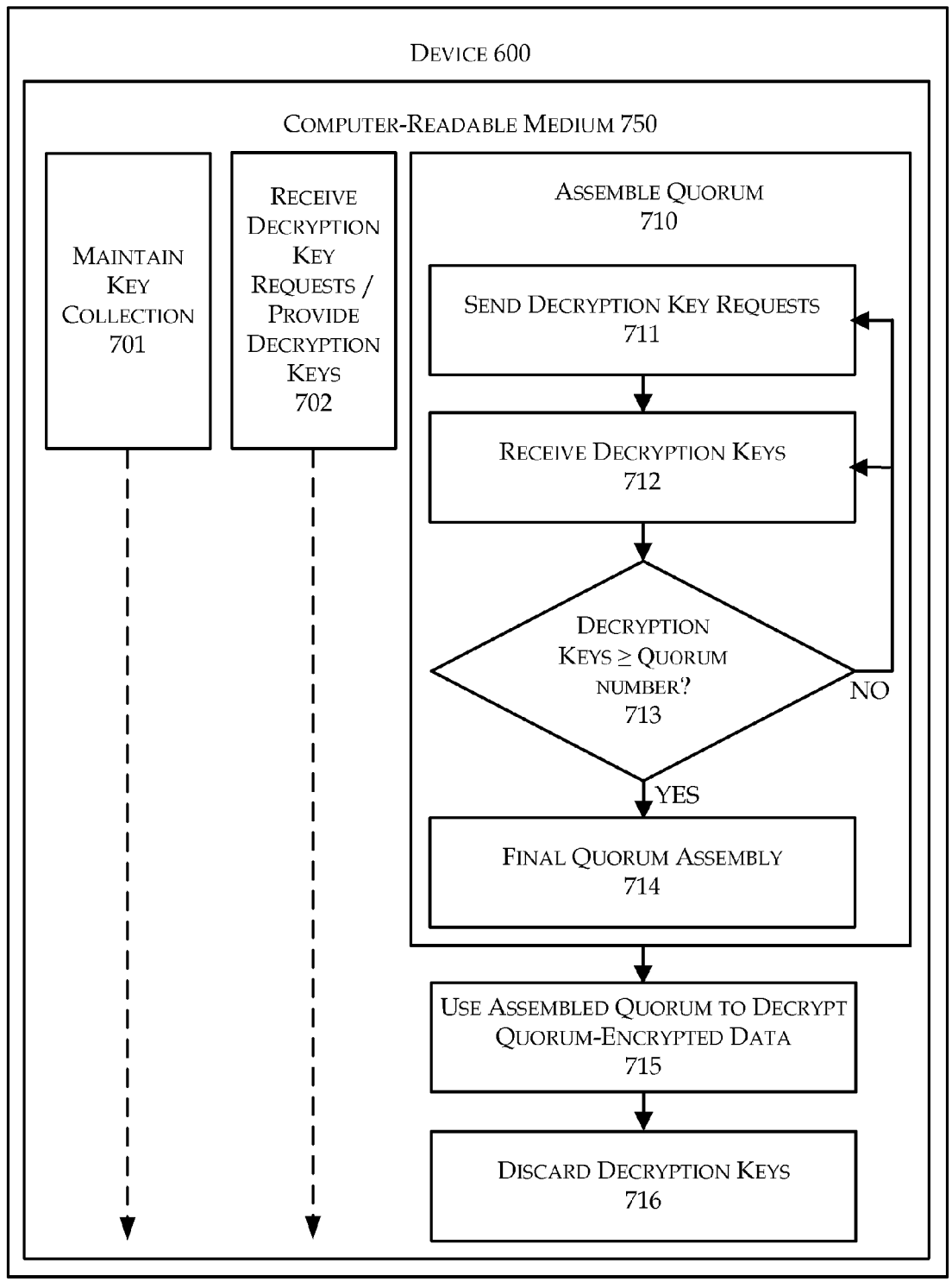
FIG. 7 is a flow diagram illustrating example methods for assembling decryption keys to decrypt quorum-encrypted data, all arranged in accordance with at least some embodiments of the present disclosure.

FIG. 7 is a flow diagram illustrating example methods for assembling decryption keys to decrypt quorum-encrypted data, arranged in accordance with at least some embodiments of the present disclosure. The example flow diagram may include one or more operations/modules as illustrated by blocks 701, 702, and 710-716, which represent operations as may be performed in a method, functional modules in a device 600, and/or instructions as may be recorded on a computer readable medium 750.

In FIG. 7, blocks 701, 702 and the group comprising blocks 710-716 are illustrated as being performed simultaneously, while blocks 711-716 are illustrated as being performed sequentially, with block 711 first and block 716 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 7 illustrates example methods by which keymaster 200 at a VM, such as VM 110 at computing device 600 may assemble a quorum of decryption keys by requesting decryption keys held by other VMs, and use the assembled quorum to decrypt quorum-encrypted data. Meanwhile, keymaster 200 may also maintain a key collection comprising decryption keys for use by other VMs, and keymaster 200 may receive decryption key requests from the other VMs and provide decryption keys to the other VMs for their own quorum assembly operations. The operations illustrated in FIG. 7 may be performed by keymaster 200 and/or a VM such as VM 110. For simplicity of description, the operations are described herein as operations of a VM.

At a "Maintain Key Collection" block 701, VM 110 may receive decryption keys, e.g., from security system 101, and may store received decryption keys in its key collection 301. Key collection 301 may comprise decryption keys for use by the other VMs, e.g., VMs 120 and 130, in decrypting other quorum-encrypted data, e.g., quorum-encrypted data 121 and 131. Key collection 301 may also comprise a local decryption key such as decryption key 112 in some embodiments, where decryption key 112 may be for use by VM 110 and not other VMs 120 or 130. VM 110 may store key identification data corresponding to decryption keys in key collection 301, for use in matching key requests to decryption keys in key collection 301. Decryption keys in decryption key collection 301 may be encrypted or unencrypted. When security system 101 re-generates decryption keys for quorum-encrypted data, e.g., quorum-encrypted data 121, VM 110 may receive re-generated decryption keys for decryption key collection 301, such as a re-generated decryption key 122, and VM 110 may replace decryption keys in decryption key collection 301 with the re-generated decryption keys.

At a "Receive Decryption Key Requests/Provide Decryption Keys" block 702, VM 110 may receive a decryption key request, and VM 110 may provide, in response to the received decryption key request, a decryption key from decryption key collection 301 for use by at least one other VM. For example, VM 110 may receive a decryption key request from VM 120 and may provide, in response to the received decryption key request, decryption key 122 from decryption key collection 301 for use by VM 120. VM 110 may parse received decryption key requests for decryption key identification data, and may use decryption key identification data to look up decryption key 122 in key collection 301. VM 110 may then send identified decryption key 122 to requesting VM 120.

It will be appreciated that sending and receiving operations described herein may comprise direct or indirect communications. For example, in some embodiments, VM 110 may receive a request directly from VM 120, while in some embodiments, VM 120 may post a request to a messaging service and VM 110 may for example retrieve decryption key requests from the message service. Alternately VM 120 may post a request to a message service and VM 110 may respond to VM 120 via direct messages, such as http POST or GET messages. Any number of other embodiments may be implemented in particular embodiments.

In some embodiments, VM 110 may authenticate received decryption key requests, e.g. by checking a digital signature associated with the request to determine if the digital signature matches the identity of the requesting VM 120. Any authentication protocol may be used. In embodiments including request authentication, VM 110 may provide the requested decryption key from the decryption key collection in response to the received decryption key request when the decryption key request is authenticated. Blocks 701 and 702 may be performed at any time before, during, or after blocks 710-716.

At an "Assemble Quorum" block 710, VM 110 may assemble a quorum of decryption keys to decrypt an item of quorum-encrypted data, such as quorum-encrypted data 111. In some embodiments, block 710 may initially determine a number of decryption keys (a quorum number) to decrypt quorum-encrypted data 111. The quorum number may be determined e.g. from metadata associated with quorum-encrypted data 111, or by looking up the quorum number in a table held by VM 110 in which items of quorum-encrypted data may be associated with individual quorum numbers. In some embodiments, a same quorum number may be used for all quorum-encrypted data, and determining a quorum number may be implicit in any of the operations conducted by block 710.

In some embodiments, block 710 may be performed substantially upon launch of VM 110, and block 710 may assemble a quorum of decryption keys for decryption of payload data associated with VM 110. The term "payload" as used herein refers to a collection of substantially all data used by a VM instance. In some embodiments, payloads may comprise substantially all user-profile data, while basic VM operating data may be outside of payload data. In some embodiments, block 710 may be performed in response to an access of any quorum-encrypted data item by VM 110. For example, VM may be configured to identify a data item as quorum-encrypted, e.g., through use of a quorum-encryption file type or quorum-encryption flag in associated metadata, and to initiate block 710 as part of opening or otherwise accessing a quorum-encrypted data item. Block 710 may include blocks 711-714.

At a "Send Decryption Key Requests" block 711, VM 110 may send decryption key requests for decryption keys for quorum-encrypted data 111 held by other VMs 120 and/or 130. The decryption key requests may identify quorum-encrypted data 111, or VM 110, or may identify requested decryption keys, or may provide any other identifier sufficient to identify the requested decryption keys, e.g., decryption key 113 and 114, by VMs 120 and 130.

In some embodiments, block 711 may comprise determining how many decryption key requests to send, and/or which VMs to send decryption key requests to. For example, security system 101 may supply VM 110 with identifiers for all VMs holding quorum decryption keys for quorum-encrypted data 111. VM 110 may send decryption key requests to each of the identified VMs, e.g., to VM 120 and VM 130. Alternatively, VM 110 may send decryption key requests to a subset of VMs, such as one of VM 120 or VM 130, sufficient to establish quorum 210. In some embodiments, VM 110 may send multiple decryption key requests substantially simultaneously. In some embodiments, decryption key requests may be sent serially, where each decryption key request may be followed by blocks 712 and 713 until a number of decryption keys sufficient to assemble a quorum is received.

In some embodiments, sending the decryption key requests may make use of inter-process communications within computing device 600. When one or more of VMs 120 and 130 are hosted at computing devices other than computing device 600, sending the decryption key requests may make use of network communications. In some embodiments, decryption key requests may be sent to a service configured to gather decryption keys and/or direct decryption keys to VM 110. As noted above, requests may be sent directly or indirectly in some embodiments. Also, VM 110 may certify decryption key requests, e.g., by signing requests with a private key, or including a signed certificate with decryption key requests, to allow other VMs to authenticate the decryption key requests. Block 711 may be followed by block 712.

At a "Receive Decryption Keys" block 712, VM 110 may receive decryption keys for quorum-encrypted data 111 in response to the decryption key requests sent in block 711. In some embodiments, received decryption keys may be decrypted. In some embodiments, each time a decryption key is received; block 712 may be followed by block 713.

At a "Decryption Keys≥Quorum Number?" decision block 713, VM 110 may determine whether the number of received decryption keys for quorum-encrypted data 111, in addition to any local decryption keys held by VM 110, is equal to or greater than the number of decryption keys to decrypt quorum-encrypted data 111, that is, whether the number of received decryption for quorum-encrypted data 111 keys is equal to or greater than the quorum number associated with quorum-encrypted data 111. Both local decryption keys held by VM 110 and decryption keys received from other VMs for quorum-encrypted data 111, in response to decryption key requests sent by VM 110 in block 711, may be referred to as "received decryption keys" in this context. Block 713 may be followed by block 711 or 712 when received decryption keys are fewer than the quorum number or by block 714 when received decryption keys are equal to or greater than the quorum number.

At a "Final Quorum Assembly" block 714, VM 110 may assemble the received decryption keys for quorum-encrypted data 111 as quorum 210 of decryption keys to decrypt quorum-encrypted data 111 when a number of received decryption keys for quorum-encrypted data 111 is equal to or greater than the number of decryption keys to decrypt the quorum-encrypted data 111. In some embodiments, operations at block 714 may include, in assembled quorum 210 of decryption keys, local decryption key 112 that may be stored within VM 110, along with other decryption keys, e.g., decryption key 113, sufficient to achieve the quorum number of decryption keys in quorum 210. Local decryption key 112 may be a necessary member of assembled quorum 210. In some embodiments, block 714 may perform any operations, e.g., generating further decryption keys or other data, from quorum 210, to assemble information effective to decrypt quorum-encrypted data 111. Block 710, comprising blocks 711-714 may be followed by block 715 after completion of block 714.

At a "Use Assembled Quorum to Decrypt Quorum-Encrypted Data" block 715, VM 110 may use quorum 210, or other information effective to decrypt quorum-encrypted data 111 produced in block 714, to decrypt quorum-encrypted data 111. Decryption may generally comprise processing quorum-encrypted data 111 according to a decryption algorithm that is configured according to decryption information such as quorum 210. Block 715 may be followed by block 716.

At a "Discard Decryption Keys" block 716, VM 110 may optionally discard decryption keys received at block 712. In some embodiments, block 716 may be performed routinely after decryption at block 715. In some embodiments, block 716 may be performed in response to conditions or events in VM 110 and/or computing device 600. For example, block 716 may be performed in advance of user log off, VM shut down, and/or VM migration. Block 716 may comprise erasing decryption keys from a memory location in computing device 600, or otherwise disabling decryption keys such that they are no longer accessible by VM 110. Once block 716 is complete, VM 110 may re-assemble a quorum to again access quorum-encrypted data 111.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors which may include single or multicore configurations), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to secure data for a virtual machine in a data center, comprising:
   generating, by a security system in the data center, a set of decryption keys;
   quorum-encrypting, by the security system, data for the virtual machine using the set of decryption keys, such that a number of decryption keys within the set of decryption keys is needed to decrypt quorum-encrypted data for the virtual machine, wherein the number of decryption keys comprises more than one decryption key;
   distributing, by the security system, decryption keys of the set of decryption keys to a plurality of virtual machines in the data center, wherein:
      the virtual machine and each individual virtual machine of the plurality of virtual machines individually receive insufficient decryption keys to individually decrypt the quorum-encrypted data for the virtual machine; and
      the virtual machine and the plurality of virtual machines together receive sufficient decryption keys to decrypt the quorum-encrypted data for the virtual machine; and
   assembling, by the virtual machine, a quorum of decryption keys to decrypt the quorum-encrypted data for the virtual machine, wherein assembling the quorum of decryption keys comprises:
      requesting decryption keys from the plurality of virtual machines; and
      receiving decryption keys from operational virtual machines among the plurality of virtual machines;
      wherein the quorum-encrypted data for the virtual machine may be decrypted when at least the quorum of decryption keys is received from operational virtual machines in the data center, and wherein the quorum-encrypted data for the virtual machine may not be decrypted when the quorum of decryption keys is not received from operational virtual machines in the data center.

2. The method of claim 1, wherein the generating, quorum-encrypting, and distributing is performed for data for each of a plurality of virtual machines in the data center.

3. The method of claim 2, wherein the plurality of virtual machines in the data center comprise virtual machines corresponding to a same data center customer.

4. The method of claim 1, wherein distributing decryption keys comprises distributing more decryption keys to one or more virtual machines associated with strong security levels, and fewer decryption keys to one or more virtual machines associated with relatively weak security levels.

5. The method of claim 1, further comprising deploying a keymaster to the virtual machine, wherein the keymaster is configured to implement a keymaster process to assemble the quorum of decryption keys.

6. The method of claim 5, wherein the keymaster process further comprises:
receiving a decryption key request for a decryption key for quorum-encrypted data for at least one other virtual machine; and
providing, in response to the received decryption key request, a decryption key from a decryption key collection.

7. The method of claim 1, further comprising setting the number of decryption keys needed to decrypt the quorum-encrypted data for the virtual machine according to a security level associated with the virtual machine.

8. The method of claim 1, further comprising generating a new set of decryption keys, re-quorum-encrypting the data for the virtual machine using the new set of decryption keys, and distributing the new set of decryption keys to the plurality of virtual machines in the data center, in response to a change in a security level associated with the virtual machine.

9. The method of claim 1, wherein distributing, by the security system, the decryption keys of the set of decryption keys to the plurality of virtual machines in the data center comprises distributing at least one of the decryption keys to the virtual machine to be stored within the virtual machine and used as a local decryption key.

10. The method of claim 9, wherein the local decryption key is a necessary member of any assembled quorum of decryption keys to decrypt the quorum-encrypted data for the virtual machine.

11. A non-transitory computer readable storage medium having computer executable instructions executable by a processor, the instructions that, when executed by the processor, implement a data center security system which causes the processor to:
generate a set of decryption keys;
quorum-encrypt data for a virtual machine using the set of decryption keys, such that a number of decryption keys within the set of decryption keys is needed to decrypt quorum-encrypted data for the virtual machine, wherein the number of decryption keys comprises more than one decryption key;
distribute decryption keys of the set of decryption keys to a plurality of virtual machines in the data center, wherein:
the virtual machine and each individual virtual machine of the plurality of virtual machines individually receive insufficient decryption keys to individually decrypt the quorum-encrypted data for the virtual machine; and
the virtual machine and the plurality of virtual machines together receive sufficient decryption keys to decrypt the quorum-encrypted data for the virtual machine; and
assemble a quorum of decryption keys to decrypt the quorum-encrypted data for the virtual machine, wherein assembling the quorum of decryption keys comprises:
requesting decryption keys from the plurality of virtual machines; and
receiving decryption keys from operational virtual machines among the plurality of virtual machines;
wherein the quorum-encrypted data for the virtual machine may be decrypted when at least the quorum of decryption keys is received from operational virtual machines in the data center, and wherein the quorum-encrypted data for the virtual machine may not be decrypted when the quorum of decryption keys is not received from operational virtual machines in the data center.

12. The non-transitory computer readable storage medium of claim 11, wherein the data center security system causes the processor to perform the generating, quorum-encrypting, and distributing for data for each of a plurality of virtual machines in the data center.

13. The non-transitory computer readable storage medium of claim 12, wherein the plurality of virtual machines in the data center comprise virtual machines corresponding to a same data center customer.

14. The non-transitory computer readable storage medium of claim 11, wherein distributing decryption keys comprises distributing more decryption keys to one or more virtual machines associated with strong security levels, and fewer decryption keys to one or more virtual machines associated with relatively weak security levels.

15. The non-transitory computer readable storage medium of claim 11, wherein the data center security system causes the processor to deploy a keymaster to the virtual machine, wherein the keymaster is configured to implement a keymaster process to assemble the quorum of decryption keys.

16. The non-transitory computer readable storage medium of claim 15, wherein the keymaster process further comprises:
receiving a decryption key request for a decryption key for quorum-encrypted data for at least one other virtual machine; and
providing, in response to the received decryption key request, a decryption key from a decryption key collection.

17. The non-transitory computer readable storage medium of claim 11, wherein the data center security system causes the processor to set the number of decryption keys needed to decrypt the quorum-encrypted data for the virtual machine according to a security level associated with the virtual machine.

18. The non-transitory computer readable storage medium of claim 11, wherein the data center security system causes the processor to generate a new set of decryption keys, re-quorum-encrypt the data for the virtual machine using the new set of decryption keys, and distribute the new set of decryption keys to the plurality of virtual machines in the data center, in response to a change in a security level associated with the virtual machine.

19. The non-transitory computer readable storage medium of claim 11, wherein distributing decryption keys of the set of decryption keys to the plurality of virtual machines in the data center comprises distributing at least one of the decryption keys to the virtual machine to be stored within the virtual machine and used as a local decryption key.

20. The non-transitory computer readable storage medium of claim 19, wherein the local decryption key is a necessary member of any assembled quorum of decryption keys to decrypt the quorum-encrypted data for the virtual machine.

21. A computing device configured to provide a data center security system, comprising:
a processor;
a memory; and
a security system stored in the memory and executable by the processor, wherein the security system is configured to:
generate a set of decryption keys;
quorum-encrypt data for a virtual machine using the set of decryption keys, such that a number of decryption keys within the set of decryption keys is needed to decrypt quorum-encrypted data for the virtual machine, wherein the number of decryption keys comprises more than one decryption key;

distribute decryption keys of the set of decryption keys to a plurality of virtual machines in the data center, wherein:
  the virtual machine and each individual virtual machine of the plurality of virtual machines individually receive insufficient decryption keys to individually decrypt the quorum-encrypted data for the virtual machine; and
  the virtual machine and the plurality of virtual machines together receive sufficient decryption keys to decrypt the quorum-encrypted data for the virtual machine; and
assemble a quorum of decryption keys to decrypt the quorum-encrypted data for the virtual machine, wherein assembling the quorum of decryption keys comprises:
  requesting decryption keys from the plurality of virtual machines; and
  receiving decryption keys from operational virtual machines among the plurality of virtual machines;
  wherein the quorum-encrypted data for the virtual machine may be decrypted when at least the quorum of decryption keys is received from operational virtual machines in the data center, and wherein the quorum-encrypted data for the virtual machine may not be decrypted when the quorum of decryption keys is not received from operational virtual machines in the data center.

* * * * *